US012793709B2

(12) United States Patent
Yoo

(10) Patent No.: US 12,793,709 B2
(45) Date of Patent: Nov. 10, 2026

(54) ELECTRONIC APPARATUS AND METHOD OF CONTROLLING THE SAME

(71) Applicant: SAMSUNG ELECTRONICS CO., LTD., Suwon-si (KR)

(72) Inventor: Jiwon Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 335 days.

(21) Appl. No.: 17/895,731

(22) Filed: Aug. 25, 2022

(65) Prior Publication Data

US 2022/0406308 A1 Dec. 22, 2022

Related U.S. Application Data

(63) Continuation of application No. PCT/KR2021/017218, filed on Nov. 23, 2021.

(30) Foreign Application Priority Data

Dec. 10, 2020 (KR) ........................ 10-2020-0172604

(51) Int. Cl.
*G10L 15/22* (2006.01)

(52) U.S. Cl.
CPC ........ *G10L 15/22* (2013.01); *G10L 2015/223* (2013.01)

(58) Field of Classification Search
CPC .... G10L 15/00; G10L 15/22; G10L 2015/223
See application file for complete search history.

(56) References Cited

U.S. PATENT DOCUMENTS

2002/0194000 A1 12/2002 Anderson et al.
2005/0240404 A1* 10/2005 Gurram .................. G10L 15/32 704/231
2012/0053942 A1 3/2012 Minamino et al.
2012/0265528 A1* 10/2012 Gruber ................. G10L 15/183 704/235
2014/0163978 A1 6/2014 Basye et al.
2016/0042748 A1 2/2016 Jain et al.
(Continued)

FOREIGN PATENT DOCUMENTS

CN 102439661 A 5/2012
CN 110570862 A 12/2019
(Continued)

OTHER PUBLICATIONS

International Search Report (PCT/ISA/210) issued by the International Searching Authority dated Feb. 28, 2022 in International Application No. PCT/KR2021/017218.
(Continued)

*Primary Examiner* — Sean E Serraguard
(74) *Attorney, Agent, or Firm* — Sughrue Mion, PLLC

(57) ABSTRACT

An electronic device includes a processor configured to: receive a user voice input, identify a state of the electronic device corresponding to at least one item related to the electronic device, select a voice recognition engine corresponding to the identified state, from among a plurality of voice recognition engines, based on correlations between the plurality of voice recognition engines and a plurality of states, and perform an operation corresponding to the user voice input based on the selected voice recognition engine.

17 Claims, 27 Drawing Sheets

(56) References Cited

U.S. PATENT DOCUMENTS

| | | | | |
|---|---|---|---|---|
| 2016/0148610 | A1* | 5/2016 | Kennewick, Jr. | G10L 15/18 704/240 |
| 2018/0174580 | A1 | 6/2018 | Kim et al. | |
| 2019/0221206 | A1* | 7/2019 | Chen | G10L 15/22 |
| 2019/0318735 | A1 | 10/2019 | Chao et al. | |
| 2020/0074996 | A1 | 3/2020 | Hamada et al. | |
| 2020/0143798 | A1 | 5/2020 | Kim et al. | |
| 2020/0184967 | A1* | 6/2020 | Gupta | G10L 15/08 |
| 2020/0342853 | A1 | 10/2020 | Kumar et al. | |
| 2020/0349940 | A1* | 11/2020 | Ko | G10L 15/063 |
| 2020/0365148 | A1 | 11/2020 | Ji et al. | |
| 2020/0372205 | A1* | 11/2020 | Bradley | G06F 16/22 |
| 2021/0005190 | A1* | 1/2021 | Ji | G06F 3/167 |
| 2021/0043204 | A1* | 2/2021 | Hwang | G10L 15/20 |
| 2021/0090555 | A1* | 3/2021 | Mahmood | G10L 13/033 |
| 2021/0350797 | A1 | 11/2021 | Choi et al. | |

FOREIGN PATENT DOCUMENTS

| | | | |
|---|---|---|---|
| CN | 110738983 | A | 1/2020 |
| EP | 3 790 005 | A1 | 3/2021 |
| JP | 2012-42748 | A | 3/2012 |
| JP | 2012-47924 | A | 3/2012 |
| KR | 10-2026479 | B1 | 9/2019 |
| KR | 10-2020-0052612 | A | 5/2020 |
| KR | 10-2020-0092742 | A | 8/2020 |
| WO | 2010/111315 | A1 | 9/2010 |
| WO | 2020/145545 | A1 | 7/2020 |

OTHER PUBLICATIONS

Written Opinion (PCT/ISA/237) issued by the International Searching Authority dated Feb. 28, 2022 in International Application No. PCT/KR2021/017218.

Communication dated Feb. 19, 2024 issued by the European Patent Office in European Application No. 21903683.7.

Communication dated Mar. 16, 2026, issued by the Korean Ministry of Intellectual Property in Korean Application No. 10-2020-0172604.

Communication dated May 22, 2026, issued by the China National Intellectual Property in Chinese Application No. 202180083130.4.

* cited by examiner

FIG. 4

400

| | | ON-DEVICE | | | SERVER | | | |
|---|---|---|---|---|---|---|---|---|
| | INTENT | 10a | 10b | 10c | 20A | 20B | 20C | 20D |
| ON-DEVICE | CHANNEL CONTROL | ○ | ○ | ○ | | | | |
| | POWER CONTROL | ○ | ○ | ○ | | | | |
| | VOLUME CONTROL | ○ | ○ | ○ | | | | |
| SERVER | Q&A | | | | ○ | | ○ | |
| | WEATHER SEARCH | | | | ○ | ○ | | |
| | SHOPPING | | | | ○ | ○ | | ○ |
| | MUSIC | | | | | ○ | ○ | ○ |
| | MOVIE | | | | | | ○ | ○ |

FIG. 5

500

| | ITEM | STATE | 10a (ON-DEVICE) | 10b (ON-DEVICE) | 10c (ON-DEVICE) | 20A (SERVER) | 20B (SERVER) | 20C (SERVER) | 20D (SERVER) |
|---|---|---|---|---|---|---|---|---|---|
| ON-DEVICE | POWER STATE | OFF | 1.0 | 1.0 | 1.0 | 0.1 | 0.1 | 0.1 | 0.1 |
| | | standby | 1.0 | 1.0 | 1.0 | 0.5 | 0.5 | 0.5 | 0.5 |
| | | ON | 1.0 | 1.0 | 1.0 | 1.0 | 1.0 | 1.0 | 1.0 |
| | NETWORK STATE | online | 1.0 | 1.0 | 1.0 | 1.0 | 1.0 | 1.0 | 1.0 |
| | | offline | 1.0 | 1.0 | 1.0 | 0.1 | 0.1 | 0.1 | 0.1 |
| | ACCOUNT-LOGIN STATE | ABSENCE | 1.0 | 0.7 | 1.0 | 0.1 | 0.1 | 0.1 | 0.1 |
| | | PRESENCE (20B) | 1.0 | 1.0 | 1.0 | 0.1 | 1.0 | 0.3 | 0.1 |
| SERVER | VOICE SPEAKER | CHILDREN | 0.1 | 0.1 | 0.1 | 0.8 | 0.5 | 1.0 | 0.3 |
| | | WOMEN | 0.1 | 0.1 | 0.1 | 0.5 | 1.0 | 0.3 | 0.8 |
| | | MEN | 0.1 | 0.1 | 0.1 | 0.3 | 0.8 | 0.5 | 0.8 |
| | | THE ELDERLY | 0.1 | 0.1 | 0.1 | 0.8 | 0.5 | 1.0 | 0.3 |
| | VOICE ROUTE | REMOTE CONTROLLER | 1.0 | 1.0 | 1.0 | 1.0 | 0.1 | 0.1 | 0.1 |
| | | MICROPHONE | 1.0 | 1.0 | 1.0 | 1.0 | 0.5 | 0.5 | 0.1 |
| | | EXTERNAL LOUDSPEAKER | 0.1 | 0.1 | 0.1 | 0.5 | 1.0 | 1.0 | 1.0 |
| | TRIGGER (INTENT ANALYSIS ENGINE) | TRIGGER ENGINE ANALYSIS INTENT SELECTION YES | 1.0 | 1.0 | 1.0 | 1.0 | 1.0 | 1.0 | 1.0 |
| | | TRIGGER ENGINE ANALYSIS INTENT SELECTION NO | 0.3 | 0.3 | 0.3 | 0.3 | 0.3 | 0.3 | 0.3 |
| | | NO-TRIGGER ENGINE ANALYSIS INTENT SELECTION YES | 0.5 | 0.5 | 0.5 | 0.5 | 0.5 | 0.5 | 0.5 |
| | | NO-TRIGGER ENGINE ANALYSIS INTENT SELECTION NO | 0.1 | 0.1 | 0.1 | 0.1 | 0.1 | 0.1 | 0.1 |
| | APP RUNNING STATE | Web | 0.3 | 0.5 | 1.0 | 1.0 | 0.3 | 0.3 | 0.5 |
| | | OTT | 0.1 | 0.1 | 0.1 | 1.0 | 0.3 | 0.3 | 0.5 |
| | | LiveTV | 1.0 | 1.0 | 1.0 | 0.2 | 0.7 | 0.2 | 0.2 |
| | | ENGINE APP OF 20C | 0.1 | 0.1 | 0.1 | 0.2 | 0.2 | 1.0 | 0.2 |
| | | OTHER APPS | 1.0 | 1.0 | 1.0 | 0.2 | 0.2 | 1.0 | 0.2 |

FIG. 6

600

| ITEM | CHANNEL CONTROL | POWER CONTROL | |
|---|---|---|---|
| POWER STATE | ON | OFF | |
| NETWORK STATE | online | offline | |
| ACCOUNT-LOGIN STATE | ABSENCE | ABSENCE | |
| VOICE SPEAKER | MEN | WOMEN | |
| VOICE ROUTE | MICROPHONE | MICROPHONE | • • • |
| TRIGGER (INTENT ANALYSIS ENGINE) | TRIGGER ENGINE ANALYSIS INTENT SELECTION YES | TRIGGER ENGINE ANALYSIS INTENT SELECTION YES | |
| APP RUNNING STATE | LiveTV | etc. | |
| SELECTION ENGINE | ENGINE 10b | ENGINE 10a | |
| SELECTION TIMES | 56 TIMES | 28 TIMES | |
| RULE DESIGNATION | YES | NO | |

| INTENT | 10a | 10b | 10c | 20A | 20B | 20C | 20D |
|---|---|---|---|---|---|---|---|
| CHANNEL CONTROL | O | O | O | | | | |
| POWER CONTROL | O | O | O | | | | |
| VOLUME CONTROL | O | O | O | | | | |
| Q&A | | | | O | | O | |
| WEATHER SEARCH | | | | O | O | | |
| SHOPPING | | | | O | O | | O |
| MUSIC | | | | | O | O | O |
| MOVIE | | | | | | O | O |

| STATE | 20A | 20B | 20C | 20D |
|---|---|---|---|---|
| MEN | 0.3 | 0.8 | 0.5 | 0.8 |
| MICROPHONE | 1.0 | 0.5 | 0.5 | 0.1 |
| NO-TRIGGER ENGINE ANALYSIS INTENT SELECTION YES | 0.5 | 0.5 | 0.5 | 0.5 |
| LiveTV | 0.2 | 0.7 | 0.2 | 0.2 |
| SUM | 2.0 | 2.5 | 1.7 | 1.6 |

400

FIRST REFERENCE DATA

| INTENT | 10a | 10b | 10c | 20A | 20B | 20C | 20D |
|---|---|---|---|---|---|---|---|
| CHANNEL CONTROL | ○ | ○ | ○ | | | | |
| POWER CONTROL | ○ | ○ | ○ | | | | |
| VOLUME CONTROL | ○ | ○ | ○ | | | | |
| Q&A | | | | ○ | | ○ | |
| WEATHER SEARCH | | | | ○ | ○ | | |
| SHOPPING | | | | ○ | ○ | | ○ |
| MUSIC | | | | | ○ | ○ | ○ |
| MOVIE | | | | | | ○ | ○ |

500

SECOND REFERENCE DATA

| STATE | 20A | 20B |
|---|---|---|
| ON | 1.0 | 1.0 |
| online | 1.0 | 1.0 |
| ABSENCE | 0.1 | 0.1 |
| MEN | 0.3 | 0.8 |
| MICROPHONE | 1.0 | 0.5 |
| NO-TRIGGER ENGINE ANALYSIS INTENT SELECTION YES | 1.0 | 1.0 |
| LiveTV | 1.0 | 0.3 |
| SUM | 5.4 | 4.7 |

THIRD REFERENCE DATA

600

| ITEM | CHANNEL CONTROL |
|---|---|
| POWER STATE | ON |
| NETWORK STATE | online |
| ACCOUNT-LOGIN STATE | ABSENCE |
| VOICE SPEAKER | MEN |
| VOICE ROUTE | MICROPHONE |
| TRIGGER (INTENT ANALYSIS ENGINE) | TRIGGER ENGINE ANALYSIS INTENT SELECTION YES |
| APP RUNNING STATE | Live TV |
| SELECTION ENGINE | ENGINE 10b |
| SELECTION TIMES | 56 TIMES |
| RULE DESIGNATION | YES |

500

SECOND REFERENCE DATA

| STATE | 20A | 20B | 20C | 20D |
|---|---|---|---|---|
| MEN | 0.3 | 0.8 | 0.5 | 0.8 |
| MICROPHONE | 1.0 | 0.5 | 0.5 | 0.1 |
| NO-TRIGGER ENGINE ANALYSIS INTENT SELECTION YES | 0.5 | 0.5 | 0.5 | 0.5 |
| LiveTV | 0.2 | 0.7 | 0.2 | 0.2 |
| SUM | 2.0 | 2.5 | 1.7 | 1.6 |

TIME TAKEN IN DERIVING RESULTS

| 20A | 20B | 20C |
|---|---|---|
| 5s | 3s | 10s |

SECOND REFERENCE DATA

| STATE | 10a | 10b | 10c |
|---|---|---|---|
| ON | 1.0 | 1.0 | 1.0 |
| online | 1.0 | 1.0 | 1.0 |
| ABSENCE | 1.0 | 0.7 | 1.0 |
| SUM | 3.0 | 2.7 | 3.0 |

HISTORY DATA

| CHANNEL CONTROL |
|---|
| ON |
| online |
| ABSENCE |
| MEN |
| MICROPHONE |
| NO-TRIGGER ENGINE ANALYSIS INTENT SELECTION YES |
| Live TV |
| ENGINE 10c |

| STATE | 10a | 10b | 10c |
|---|---|---|---|
| ON | 1.0 | 1.0 | 1.0 |
| online | 1.0 | 1.0 | 1.0 |
| ABSENCE | 1.0 | 0.7 | 1.0 |
| SUM | 3.0 | 2.7 | 3.0 |

| USER | ENGINE | RECOGNITION RESULT |
|---|---|---|
| USER B | ENGINE 10c | CHANNEL B |
| USER C | ENGINE 10a | CHANNEL A |

SECOND REFERENCE DATA

500

| ITEM | STATE | 10a | 10b | 10c |
|---|---|---|---|---|
| POWER STATE | ON | 1.0 | 1.0 | 1.0 |
| NETWORK STATE | online | 1.0 | 1.0 | 1.0 |
| ACCOUNT-LOGIN STATE | ABSENCE | 1.0 | 0.7 | 1.0 |
| SUM | | 3.0 | 2.7 | 3.0 |
| PRIORITY SET BY USER | | 2 | 3 | 1 |

| ENGINE | RECOGNITION RESULTS | PRIORITY SET BY USER |
|---|---|---|
| ENGINE 10a | CHANNEL A | 2 |
| ENGINE 10c | CHANNEL A | 1 |

FIG. 17

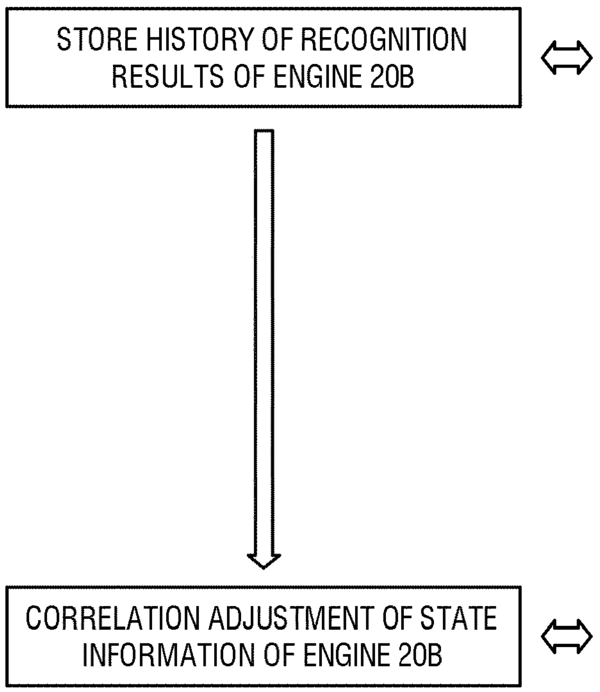

HISTORY DATA

| ITEM | HISTORY |
|---|---|
| POWER STATE | ON |
| NETWORK STATE | online |
| ACCOUNT-LOGIN STATE | ABSENCE |
| VOICE SPEAKER | MEN |
| VOICE ROUTE | MICROPHONE |
| TRIGGER (INTENT ANALYSIS ENGINE) | NO-TRIGGER ENGINE ANALYSIS INTENT SELECTION YES |
| APP RUNNING STATE | Live TV |
| SELECTION ENGINE | ENGINE 20B |
| USER | A |
| CATEGORY | WEATHER SEARCH |
| RECOGNITION RESULT | CLOUDY |

SECOND REFERENCE DATA

500

| STATE | 20A | 20B | 20C | 20D |
|---|---|---|---|---|
| MEN | 0.3 | 0.8+(0.1) | 0.5 | 0.8 |
| MICROPHONE | 1.0 | 0.5+(0.1) | 0.5 | 0.1 |
| NO-TRIGGER ENGINE ANALYSIS INTENT SELECTION YES | 0.5 | 0.5+(0.1) | 0.5 | 0.5 |
| LiveTV | 0.2 | 0.7+(0.1) | 0.2 | 0.2 |
| SUM | 2.0 | 2.9 | 1.7 | 1.6 |

SECOND REFERENCE DATA

500

| STATE | 10a | 10b | 10c | 20A | 20B | 20C | 20D |
|---|---|---|---|---|---|---|---|
| ON | 1.0 | 1.0 | 1.0 | 1.0 | 1.0 | 1.0 | 1.0 |
| online | 1.0 | 1.0 | 1.0 | 1.0 | 1.0 | 1.0 | 1.0 |
| ABSENCE | 1.0 | 0.7 | 1.0 | 0.1 | 0.1 | 0.1 | 0.1 |
| MEN | 0.1 | 0.1 | 0.1 | 0.3 | 0.8 | 0.5 | 0.8 |
| MICROPHONE | 1.0 | 1.0 | 1.0 | 1.0 | 0.5 | 0.5 | 0.1 |
| NO-TRIGGER ENGINE ANALYSIS INTENT SELECTION YES | 0.5 | 0.5 | 0.5 | 0.5 | 0.5 | 0.5 | 0.5 |
| LiveTV | 1.0 | 1.0 | 1.0 | 0.2 | 0.7 | 0.2 | 0.2 |
| SUM | 5.6 | 5.3 | 5.6 | 4.1 | 4.6 | 3.8 | 3.7 |

400

FIRST REFERENCE DATA

| INTENT | 10a | 10b | 10c | 20A | 20B | 20C | 20D |
|---|---|---|---|---|---|---|---|
| CHANNEL CONTROL | ○ | ○ | ○ | | | | |
| POWER CONTROL | ○ | ○ | ○ | | | | |
| VOLUME CONTROL | ○ | ○ | ○ | | | | |
| Q&A | | | | ○ | | ○ | |
| WEATHER SEARCH | | | | ○ | ○ | | |
| SHOPPING | | | | ○ | ○ | | ○ |
| MUSIC | | | | | ○ | ○ | ○ |
| MOVIE | | | | | | ○ | ○ |

SECOND REFERENCE DATA

500

| STATE | 20A | 20B |
|---|---|---|
| ON | 1.0 | 1.0 |
| online | 1.0 | 1.0 |
| ABSENCE | 0.1 | 0.1 |
| MEN | 0.3 | 0.8 |
| MICROPHONE | 1.0 | 0.5 |
| NO-TRIGGER ENGINE ANALYSIS INTENT SELECTION YES | 0.5 | 0.5 |
| LiveTV | 0.2 | 0.7 |
| SUM | 4.1 | 4.6 |

ELECTRONIC APPARATUS AND METHOD OF CONTROLLING THE SAME

CROSS-REFERENCE TO RELATED APPLICATIONS

This application is a bypass continuation application of International Application No. PCT/KR2021/017218 designating the United States, filed on Nov. 23, 2021, in the Korean Intellectual Property Receiving Office and which claims priority to Korean Patent Application No. 10-2020-0172604, filed on Dec. 10, 2020, in the Korean Intellectual Property Office, the disclosures of which are incorporated by reference herein in their entireties.

BACKGROUND

1. Field

The disclosure relates to an electronic device, which can recognize a user voice, and a method of controlling the same.

2. Description of Related Art

An electronic device having a voice recognition function may receive a user voice through a microphone, and transmit the received user voice to a voice recognition engine of a server, thereby performing voice recognition. In this case, the voice recognition engine transmits a result of recognizing a user voice to the electronic device, and the electronic device performs an operation based on the recognition result.

However, there may be a problem that the voice recognition is not performed by the voice recognition engine of the server because a user voice is not transmitted according to the states of the electronic device, for example, in a power-off state or a network disconnection state.

Further, there may be a problem that the voice recognition is inefficiently processed as the voice recognition engine of the server is selected even though it may be more efficient for a user voice command for controlling the functions of the electronic device, such as power control, channel control, volume control, etc. to be processed by an on-device voice recognition engine provided in the electronic device.

SUMMARY

The disclosure is conceived to solve the foregoing problems, and an aspect of the disclosure is to provide an electronic device and a method of controlling the same, in which the states of the electronic device are reflected in efficiently performing voice recognition.

According to an aspect of the disclosure, there is provided an electronic device including: a processor configured to receive a user voice input; identify a state of the electronic device corresponding to at least one item related to the electronic device; select a voice recognition engine corresponding to the identified state, from among a plurality of voice recognition engines, based on correlations between the plurality of voice recognition engines and a plurality of states; and perform an operation corresponding to the user voice input based on the selected voice recognition engine.

The plurality of voice recognition engines may include an on-device voice recognition engine provided in the electronic device, and a server voice recognition engine provided in a server, and the processor may be further configured to select the on-device voice recognition engine or the server voice recognition engine.

The processor may be further configured to: identify an intent corresponding to the received user voice input from among a plurality of intents, and select the voice recognition engine based on correlations between the plurality of voice recognition engines and the plurality of intents.

One among the plurality of voice recognition engines may include a default voice recognition engine, and the default voice recognition engine may be configured to analyze the intent of the user voice input.

The electronic device may further include a storage configured to store first reference data in which at least one intent from among the plurality of intents is assigned to the plurality of voice recognition engines.

The storage may be configured to store second reference data including at least one of the correlations between the correlations between the plurality of voice recognition engines and the plurality of states, and the correlations between the plurality of voice recognition engines and the plurality of intents.

The processor may be further configured to calculate a correlation of each voice recognition engine which relates to the intent of the user voice input.

The processor may be further configured to adjust at least one of the correlations between the correlations between the plurality of voice recognition engines and the plurality of states, and the correlations between the plurality of voice recognition engines and the plurality of intents based on a recognition result of the user voice input.

The processor may be further configured to: control the storage to store data about history information corresponding to recognition results of the user voice input; and select the voice recognition engine from among a plurality of voice recognition engines having a same correlation based on the history information.

The processor may be further configured to: control the storage to store data about history information corresponding to recognition results of the user voice input; and generate a rule for identifying the voice recognition engine based on the history information.

According to an aspect of the disclosure, there is provided a method of controlling an electronic device, including: receiving a user voice input; identifying a state of the electronic device corresponding to at least one item related to the electronic device; selecting a voice recognition engine corresponding to the identified state, from among a plurality of voice recognition engines, based on correlations between the plurality of voice recognition engines and a plurality of states; and performing an operation corresponding to the user voice input based on the selected voice recognition engine.

The plurality of voice recognition engines may include an on-device voice recognition engine provided in the electronic device, and a server voice recognition engine provided in a server, and the method may further include selecting the on-device voice recognition engine or the server voice recognition engine.

The method may further include: identifying an intent corresponding to the received user voice input from among a plurality of intents; and selecting the voice recognition engine based on correlations between the plurality of voice recognition engines and the plurality of intents.

One among the plurality of voice recognition engines may include a default voice recognition engine, and the default voice recognition engine may be configured to analyze the intent of the user voice input.

The method may further include storing, in a storage, first reference data in which at least one intent from among the plurality of intents is assigned to the voice recognition engines.

According to the disclosure, an electronic device selects an optimal voice recognition engine suitable for the state of the electronic device among various voice recognition engines when receiving a user voice input, thereby improving a success rate, accuracy and speed of voice recognition. In particular, the electronic device according to the disclosure selects an on-device voice recognition engine or a server voice recognition engine suitable for various situations, thereby efficiently performing the voice recognition.

BRIEF DESCRIPTION OF DRAWINGS

FIG. 4 illustrates first reference data in which engines assigned to intents of a user voice are listed by way of example, according to an embodiment.

FIG. 5 illustrates second reference data showing correlations between engines and states of items related to an electronic device, according to an embodiment.

FIG. 6 illustrates third reference data showing history data about results of recognizing and processing a user voice, according to an embodiment.

FIG. 17 shows an example of an update result in which a user voice processing result is reflected by the electronic device, according to an embodiment.

DETAILED DESCRIPTION

Figure 1:
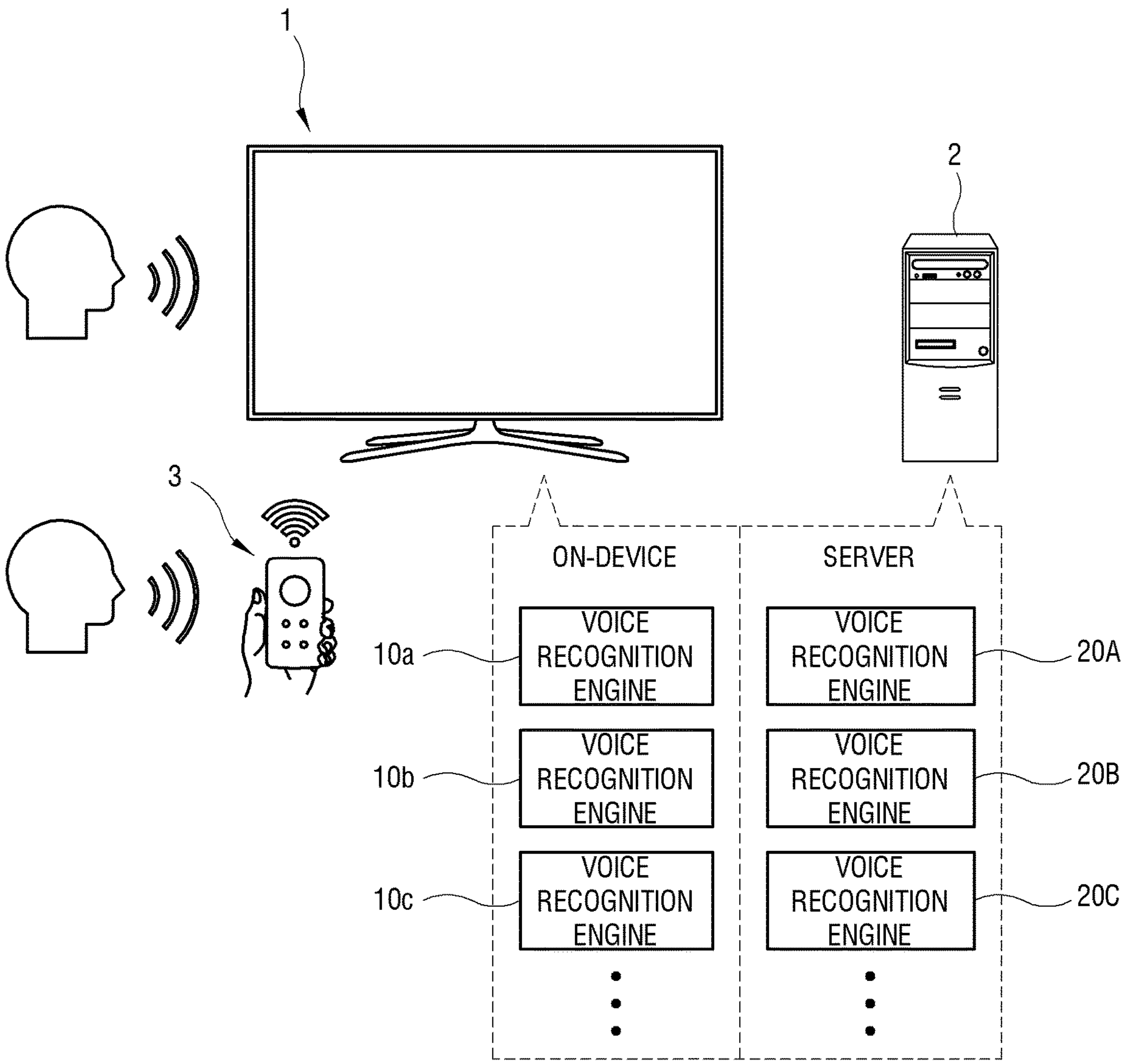
FIG. 1 illustrates an environment in which an electronic device performs voice recognition through a plurality of voice recognition engines, according to an embodiment.

Below, embodiments of the disclosure will be described in detail with reference to accompanying drawings. In the drawings, like numerals or symbols refer to like elements having substantially the same function, and the size of each element may be exaggerated for clarity and convenience of description. However, the configurations and functions illustrated in the following exemplary embodiments are not construed as limiting the present disclosure and the key configurations and functions. In the following descriptions, details about publicly known functions or features will be omitted if it is identified that they cloud the gist of the present disclosure.

As is traditional in the field, embodiments may be described and illustrated in terms of blocks which carry out a described function or functions. These blocks, which may be referred to herein as units or modules or the like, or by names such as driver, controller, device, engine, or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

In the disclosure, terms “have,” “may have,” “include,” “may include,” etc. indicate the presence of corresponding features (e.g., a numeral value, a function, an operation, or an element such as a part, etc.), and do not exclude the presence of additional features.

In the disclosure, terms "A or B", "at least one of A or/and B", "one or more of A or/and B" or the like may include all possible combinations of elements enumerated together. For example, "A or B", "at least one of A and B", or "at least one of A or B" may refer to all of the cases of (1) including at least one A, (2) including at least one B, or (3) including all of at least one A and at least one B.

In the disclosure, terms "first", "second", etc. are used only to distinguish one element from another, and singular forms are intended to include plural forms unless otherwise mentioned contextually.

In addition, in the disclosure, terms "upper", "lower", "left", "right", "inside", "outside", "inner", "outer", "front", "rear", etc. are defined with respect to the accompanying drawings, and do not restrict the shape or location of the elements.

Further, in the disclosure, the expression of "configured to (or set to)" may for example be replaced with "suitable for," "having the capacity to," "designed to," "adapted to," "made to," or "capable of" according to circumstances. Also, the expression of "configured to (or set to)" may not necessarily refer to only "specifically designed to" in terms of hardware. Instead, the "device configured to" may refer to "capable of" along with other devices or parts in a certain circumstance. For example, a phrase of "a sub processor configured to (or set to) perform A, B, and C" may mean a dedicated processor (e.g., an embedded processor) for performing a corresponding operation, or a general-purpose processor (e.g., a central processing unit (CPU) or an application processor) capable of performing operations by executing one or more software programs stored in a memory.

In the disclosure, a user may refer to a person who uses the electronic device 1 or a device (e.g., an artificial intelligence (AI) electronic device) that employs the electronic device 1.

FIG. 1 illustrates an environment in which an electronic device 1 performs voice recognition through a plurality of voice recognition engines.

As shown in FIG. 1, the electronic device 1 according to an embodiment of the disclosure may for example be a display device capable of displaying an image. When the electronic device 1 is the display device, the electronic device 1 may include a television (TV), a computer, a tablet device, a portable media player, a wearable device, a video wall, an electronic picture frame, etc. However, the electronic device 1 may include not only the display device, but also an image processing device such as a set-top box, etc. without a display; a home appliance such as a refrigerator, a washing machine, etc.; and an information processing device such as a computer, etc.; and the like various kinds of devices. Further, the electronic device 1 may include a stationary device used as installed at a certain position, or a mobile device 4 used while being moved as carried by a user.

The electronic device 1 may receive a user voice. In other words, the electronic device 1 obtains a user voice based on utterance when a user utters a predetermined command. To obtain a user voice based on utterance, the electronic device 1 may include its own built-in microphone for collecting the utterance, or may receive a user voice from a remote controller 3, a mobile phone, or similar separate external device including the microphone.

The remote controller 3 receives a voice through the microphone, digitizes an analog audio signal based on the voice, and transmits the digitized signal to the electronic device 1 through Bluetooth or the like.

The electronic device 1 receives a voice through its own built-in microphone, digitizes an analog audio signal based on the voice, and transmits the digitized signal to its own processor 16. In this case, the electronic device 1 transmits digitized voice information to a speech-to-text (STT) server.

The STT server may function as only an STT server for converting voice-related data into proper data, or may be a main server that also functions as the STT server.

The data processed in the STT server may be returned to the electronic device 1 or may be directly transmitted to another server.

The electronic device 1 may autonomously process voice information without transmitting the voice information to the STT server. In this case, the electronic device 1 itself may serve as the STT server.

The electronic device 1 may implement a specific function based on a text received from the STT server or a text converted by itself. In this case, the function is implemented by the processor 16 of the electronic device 1, but the converted text may be transmitted to a separate server (e.g., the STT server, another server or a server capable of serving as the STT server). The STT server receives and processes text data and transmits the processed data to the electronic device 1, and the electronic device implements a specific function based on the received data.

The electronic device 1 may use a plurality of voice recognition engines 10*a*, 10*b*, 10*c*, . . . , 20A, 20B, 20C, . . . , which may be referred to as "engines", to recognize the received user voice. An engine, for example an engine of the plurality of engines 10*a*, 10*b*, 10*c*, . . . , 20A, 20B, 20C, . . . , may refer to an application service that identifies an intent of utterance by analyzing content and context of a user voice based on AI and processes an operation to be performed corresponding to identification results. For example, the engines 10*a*, 10*b*, 10*c*, . . . , 20A, 20B, 20C, may derive text data by applying STT processing to a user voice input to the electronic device 1, identify the meanings of the text data by applying a semantic analysis to the derived text data based on deep learning or machine learning, and provide a service suitable for the identified meanings.

The plurality of engines 10*a*, 10*b*, 10*c*, . . . , 20A, 20B, 20C, . . . , may include on-device engines 10*a*, 10*b*, 10*c*, . . . , that perform most operations in the electronic device 1, and server engines 20A, 20B, 20C, . . . , that perform operations in the server or external device communicating with the electronic device 1.

Figure 2:
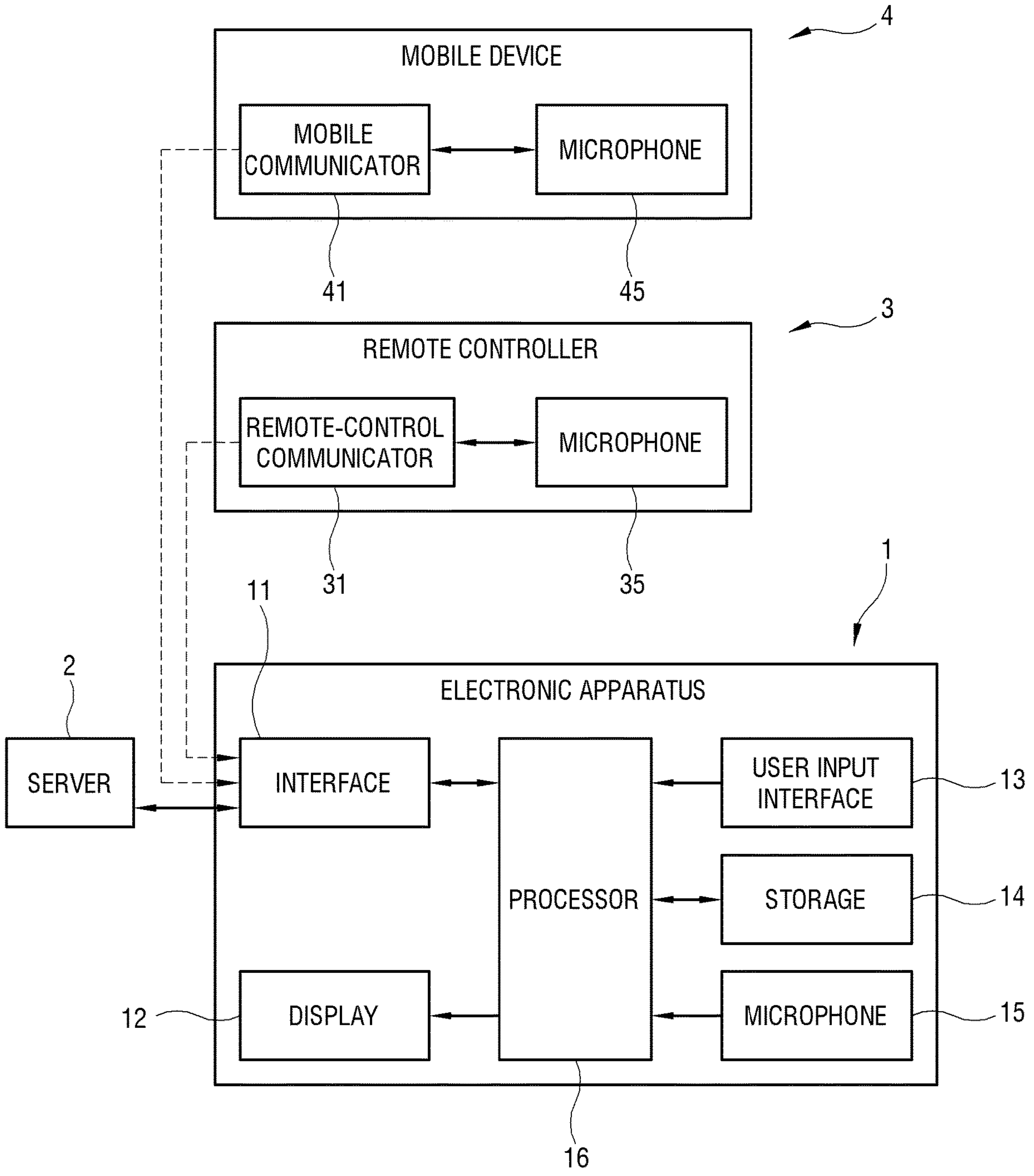
FIG. 2 is a block diagram of an electronic device.

FIG. 2 is a block diagram of an electronic device 1.

As shown in FIG. 2, the electronic device 1 includes an interface 11, a display 12, a user input interface 13, a storage 14, a microphone 15, and the processor 16.

Below, the elements of the electronic device 1 will be described. In this embodiment, the electronic device 1 is a TV, but the electronic device 1 may be various kinds of devices. Therefore, the elements of the electronic device 1 are not limited to those in this embodiment. The electronic device 1 may not be entirely embodied by the display device, and the electronic device 1 in this case may not include the display 12 and the like element for displaying an image. For example, when the electronic device 1 is the set-top box, the electronic device 1 may output an image signal to an external TV through the interface 11.

The interface 11 includes a unidirectional or bidirectional communication circuit including at least one of elements such as a communication module, a communication chip, etc. corresponding to various kinds of wired and wireless communication protocols.

The interface 11 may indirectly receive a user voice from various external devices, for example, a server 2, the remote controller 3, or the mobile device 4.

The interface 11 may include a wired interface and a wireless interface.

The wired interface may include a tuner connected to a terrestrial or satellite broadcasting antenna for receiving a broadcast signal, an interface connected to a cable for cable broadcasting, etc.

The wired interface may include a high-definition multimedia interface (HDMI), a display port (DP), a digital video interface (DVI), Component, S-video, composite (RCA terminals), etc.

The wired interface may include a universal serial bus (USB) interface, etc. for connection with general-purpose electronic devices.

The wired interface may include interfaces for connection with optical cable devices.

The wired interface may include interfaces for connection with a headset, an earphone, an external loudspeaker, and the like audio devices.

The wired interface may include interfaces for connection with Ethernet, and the like wired network devices.

The wireless interface may include interfaces for connection with Wi-Fi, Bluetooth, ZigBee, Z-wave, radio frequency identification (RFID), WiGig, wirelessHD, ultra-wide band (UWB), wireless USB, near field communication (NFC), etc.

The wireless interface may include an infrared (IR) transmitting/receiving module for transmitting and/or receiving a remote-control signal.

The wireless interface may include interfaces for connection with 2G to 5G and the like mobile communication devices.

The interface 11 may include dedicated communication modules dedicated to communication with the server 2, the remote controller 3 and the mobile device 4, respectively.

The interface 11 may include a common communication module or the like for communication with all of the server 2, the remote controller 3 and the mobile device 4. For example, all the server 2, the remote controller 3, and the mobile device 4 may perform communication through a Wi-Fi module.

The interface 11 may include an input interface and an output interface. In this case, the input interface and the output interface may be integrated into a single module, or may be provided as separate modules.

The display 12 includes a display panel for displaying an image on a screen. The display panel has a light-receiving structure like a liquid crystal type or a light-emitting structure like an OLED type. The display 12 may include an additional component according to the structures of the display panel. For example, when the display panel is of the liquid crystal type, the display 12 includes a liquid crystal display (LCD) panel, a backlight unit for emitting light, and a panel driving substrate for driving the liquid crystal of the LCD panel.

The user input interface 13 includes various kinds of input interface circuits to be controlled by a user for receiving a user input. The user input interface 13 may be variously embodied according to the kinds of electronic device 1, and may, for example, include mechanical or electronic buttons, a touch pad, a sensor, a camera, a touch screen installed in the display 12, etc.

The storage 14 as a storage is configured to store digitized data. The storage 14 includes a nonvolatile storage which retains data regardless of whether power is on or off, and a volatile memory to which data to be processed by the processor 16 is loaded and which retains data only when power is on. The storage includes a flash-memory, a hard-disc drive (HDD), a solid-state drive (SSD) a read only memory (ROM), etc. and the memory includes a buffer, a random access memory (RAM), etc. In this embodiment, the storage 14 may be configured to store the plurality of engines 10a, 10b, 10c, . . . and a plurality of applications for running the engines. The applications stored in the storage 14 may be driven by the processor 16 to operate the engines 10a, 10b, 10c, . . . .One among the plurality of engines 10a, 10b, 10c, . . . may be set as a default to analyze an intent of a user voice.

The storage 14 may be configured to store first reference data 400, as shown for example in FIG. 4, in which correlations between state information of the electronic device 1 and the engines are set; second reference data, as shown for example in FIG. 4, in which at least one intent selected among the plurality of intents is assigned according to the engines, as shown for example in FIG. 5, history data, as shown for example in FIG. 6, in which engine selection, recognition results, and operation are recorded with regard to user voices, and engine selection rule data.

The microphone 15 is configured to select sounds of external environments such as a user voice. The microphone 15 transmits an audio signal of collected sounds to the processor 16.

The processor 16 may include one or more hardware processors embodied by a CPU, a chipset, a buffer, a circuit, etc. mounted onto a printed circuit board, and may also be designed as a system on chip (SOC). The processor 16 includes modules corresponding to various processes, such as a demultiplexer, a decoder, a scaler, an audio digital signal processor (DSP), an amplifier, etc. when the electronic device 1 is a display device. Here, some or all of the modules may be included in the SOC. For example, the demultiplexer, the decoder, the scaler, and the like modules related to video processing may be included in a video processing SOC, and the audio DSP may be included in a chipset separated from the SOC.

The processor 16 may for example be configured to operate a default engine 10a to analyze an intent of a user voice.

The processor 16 may be configured to select an engine, or engines, suitable for the state of the electronic device 1 of an item related to the electronic device 1 among the plurality of engines 10a, 10b, 10c, . . . , 20A, 20B, 20C, . . . , and transmit a user voice to the selected engine, or engines, for voice recognition.

The processor 16 may be configured to receive recognition results of the engine, or engines, and may for example perform operations of implementing the function of the electronic device 1, output a result, store the result, transmit the result to an external device, etc.

The electronic device 1 may obtain a voice uttered by a user by various methods as follows.

The electronic device 1 may include the microphone 15 configured to collect sounds. An audio signal of a user voice collected through the microphone 15 is converted into a digital signal and transmitted to the processor 16.

In embodiments, when the remote controller 3 includes a microphone 35, the electronic device 1 may receive an audio signal of a user voice collected through the microphone 35 from the remote controller 3 through the interface 11. The remote controller 3 converts the audio signal of the user voice collected through the microphone 35 into a digital signal, and transmits the digital signal to the interface through a remote-control communicator 31 according to protocols for receiving the digital signal. In embodiments, a communicator such as remote-control communicator 31 and mobile communicator 41, may be, for example, a communication interface, which may include a unidirectional or bidirectional communication circuit including at least one of elements such as a communication module, a communication chip, etc.

In embodiments, in the case of the mobile device 4 and similar general-purpose devices, an application provided for controlling the electronic device 1 is installed and executed so that the mobile device 4 can operate like the remote controller 3. The mobile device 4 converts an audio signal of a user voice collected through the microphone 45 while the application is running, and transmits the audio signal to the interface 11 through a mobile communicator 41.

Below, examples will be described in which the processor 16 according to an embodiment of the disclosure selects at least one among the plurality of engines 10*a*, 10*b*, 10*c*, . . . , 20A, 20B, 20C, . . . , to process a user voice.

Figure 3:
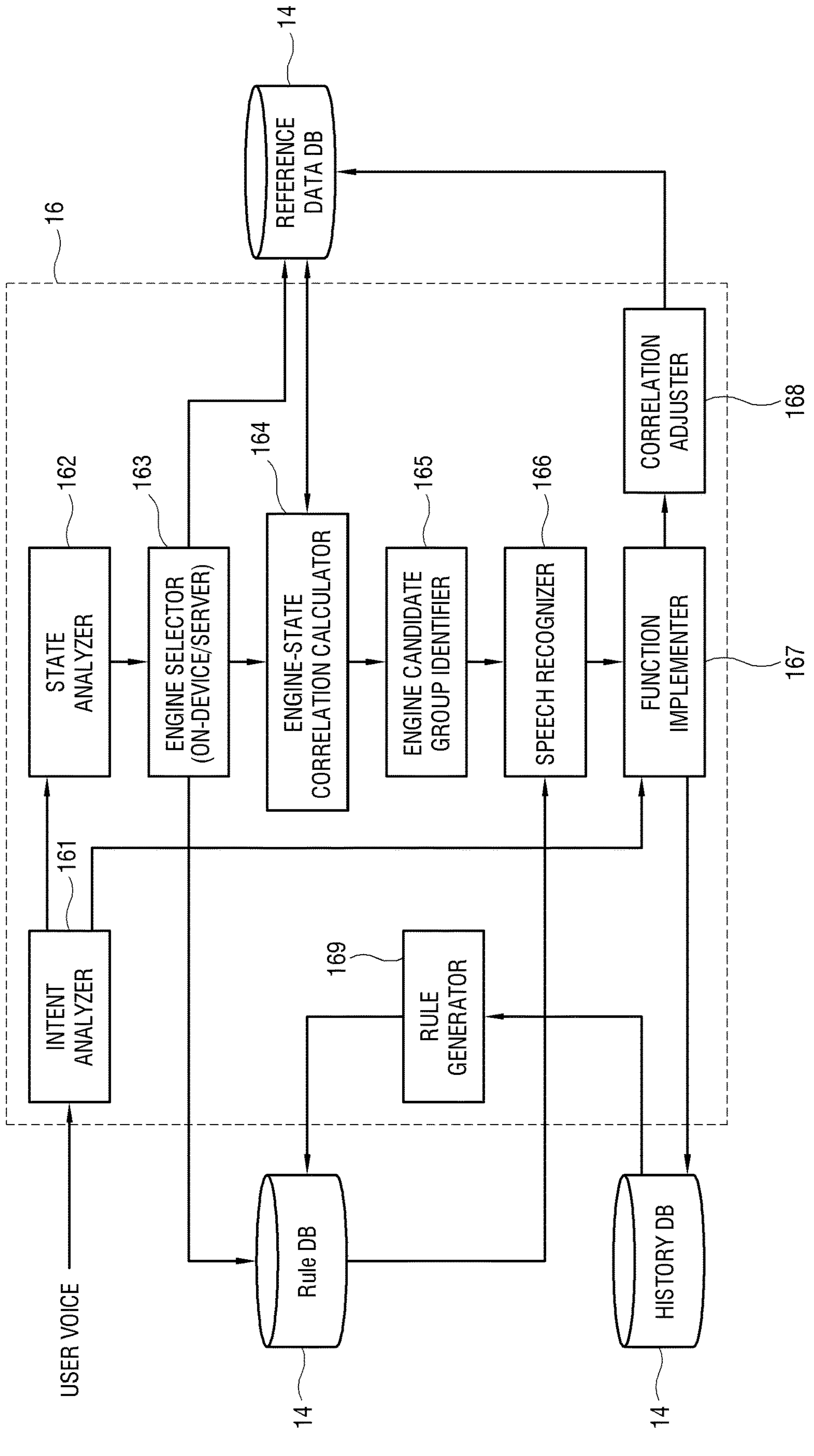
FIG. 3 is a block diagram of a processor in an electronic device according to a first embodiment of the disclosure.

FIG. 3 is a block diagram of the processor 16 in an electronic device 1 according to a first embodiment of the disclosure, FIG. 4 illustrates first reference data 400 in which engines assigned to intents of a user voice are listed by way of example, FIG. 5 illustrates second reference data 500 showing correlations between engines and states of items related to the electronic device 1, and FIG. 6 illustrates third reference data 600 showing history data about results of recognizing and processing a user voice.

As shown in FIG. 3, an operation of processing a user voice by selecting at least one among the plurality of engines 10*a*, 10*b*, 10*c*, 20A, 20B, 20C, 20D is performed by the processor 16 of the electronic device 1. Further, the electronic device 1 and the server 2 may include a plurality of on-device engines 10*a*, 10*b* and 10*c*, and a plurality of server engines 20A, 20B, 20C and 20D, respectively.

The processor 16 may include an intent analyzer 161, a state analyzer 162, an engine selector 163, an engine-state correlation calculator 164, an engine candidate group identifier 165, a speech recognizer 166, a function implementer 167, a correlation adjuster 168, and a rule generator 169.

When a user voice is received through a predetermined route, the intent analyzer 161 operates a default engine, for example, the engine 10*a* and analyzes an intent of a user voice. The intent of the user voice may for example be analyzed by a method of using a support vector machine (SVM), a deep-learning based model, or a convolutional neural network model.

As shown in FIG. 4, the intent of the user voice refers to a command or service request desired by a user, and may for example include at least one of channel control, power control, volume control, question & answer (Q&A), weather search, shopping, shopping, music or movie. However, the intent of the user voice is not limited to the foregoing intents.

The engines 10*a*-10*c* and 20A-20D may provide at least one intent on which they mainly focus. For example, all the on-device engines 10*a*-10*c* may provide the intents of channel control, power control and volume control. Further, the server engine 20A may provide the intents of Q&A, weather search and shopping; the server engine 20B may provide the intents of weather search, shopping and music; the server engine 20C may provide the intents of Q&A, music and movie; and the server engine 20D may provide the intents of shopping, music and movie. In embodiments, on-device engines 10*a*-10*c* may allow function control of the electronic device 1, and the server engines 20A-20D may allow provision of services desired by a user.

In the first reference data 400, the intents of the channel control, the power control and the volume control may be grouped into a first intent group related to the on-device engines 10*a*-10*c*, and the intents of the Q&A, the weather search, the shopping and the movie may be grouped into a second intent group related to the server engines 20A-20D.

The number of intents provided by the engines 10*a*-10*c* and 20A-20D is not limited to three as shown in FIG. 4, and the intents provided by the engines 10*a*-10*c* and 20A-20D may duplicated with each other.

The state analyzer 162 shown in FIG. 3 may analyze the state of the electronic device 1 about at least one item correlated to the electronic device 1.

As shown in FIG. 5, the items related to the electronic device 1 may for example include at least one of a power state, a network state, an account-login state, a voice speaker, a voice input route, trigger presence, or an application state. However, the items correlated to the electronic device 1 are not limited to the foregoing items.

The states of the electronic device 1 may for example be divided into power "OFF", "standby" and "ON" of the power state item; "online" and "offline" of the network state item; "absence" and "presence" of the account-login state item; "children", "women", "men" and "the elderly" of the voice speaker item; "a remote controller", "a microphone" and "an external loudspeaker" of the voice route item; "trigger engine analysis intent selection of YES", "trigger engine analysis intent selection of NO", "no-trigger engine analysis intent selection of YES", and "no-trigger engine analysis intent selection of NO" of the trigger (intent analysis engine) item; and "Web", "OTT", LiveTV", "App of the engine 20C", and "other apps" of the app running state item. However, the states of the electronic device 1 are not limited to the foregoing states.

In the second reference data 500 shown in FIG. 5, correlations, which show how much the plurality of engines are related to at least one item correlated to the electronic device 1 and the states of the electronic device 1 that belongs to each item, may be previously set. Such a correlation may be adjusted to increase or decrease as experience of voice recognition is accumulated.

In the second reference data 500, a correlation of '1.0' was given to the engine having the highest relationship with the state, and a correlation of '0.1' was given to the engine having the lowest relationship with the state. However, such a correlation is merely an example for description, and may be various set with regard to other references such as '1-100', %, etc.

In the second reference data 500, the plurality of engines may be classified into the on-device engines 10*a*-10*c* of the electronic device 1 and the server engines 20A-20D.

In the second reference data 500, among the items related to the electronic device 1, the power state, the network state and the account-login state are classified into the first state group related to the on-device engines 10*a*-10*c*, and the voice speaker, the voice input route, the trigger presence and the application state are classified into the second state group related to the server engines 20A-20D.

The engine selector 163 is configured to search for whether there is an engine related to the intent of the user voice and the state of the electronic device 1 is set as an engine selection rule based on the third reference data 600 of a rule database (DB) of the storage 14.

As shown in FIG. 6, the third reference data 600 refers to data in which voice recognition histories processed by specific engines with regard to the intents of the user voice and the states of the electronic device are repetitively stored, and the engine selection rule is made when the same results are recorded more than a certain number of times.

In the third reference data 600, the intent of "channel control", the power state of "ON", the network state of "online", the account-login state of "absence", the voice speaker of "men", the voice input route of "microphone", the trigger of "trigger engine analysis intent selection of YES", or the application state of "LiveTV", the selection engine of "engine 10*b*", the selection times of "56", and the rule designation of "YES" are recorded as first history data. The engine selection rule may be generated when the selection of the same engine to perform processing with regard to the same intent and the same state of the electronic device is repeated more than a predetermined number of times, for example, more than 50 times. Here, the number of times for designating the engine selection rule is not limited to 50 times.

According to an embodiment, the electronic device 1 may generate the engine selection rule when the correlation, increased by correlation adjustment based on an updated processing result of a user voice, is greater than a predetermined value.

Further, in the third reference data 600, the intent of "power control", the power state of "OFF", the network state of "offline", the account-login state of "absence", the voice speaker of "women", the voice input route of "microphone", the trigger of "trigger engine analysis intent selection of YES", or the application state "etc.", the selection engine of "engine 10*a*, the selection times of "28" and the rule designation of "NO" are recorded as the second history data. The second history data may be designated as the engine selection rule when it is added 22 more times.

The third reference data 600 shown in FIG. 6 is for illustrative purpose only, and there are no limits to the third reference data 600.

The engine selector 163 may directly select the engine 10*b* by skipping other procedures when the analyzed intent and state are the same as those of the first history data designated as the rule in the third reference data 600 shown in FIG. 6.

The engine selector 163 proceeds with the next procedure for selecting an optimal engine when there is no rule designation for the analyzed intent and state. The engine selector 163 uses the first reference data 400 and/or the second reference data 500 of a reference data DB to select one among the on-device engines 10*a*-10*c* or the server engines 20A-20D.

The engine-state correlation calculator 164 shown in FIG. 3 calculates the correlations of the engines in either the on-device engines 10*a*-10*c* or the server engines 20A-20D based on the second reference data 500 of the reference data DB.

When it is identified that a user voice is related to the on-device engines 10*a*-10*c*, the engine-state correlation calculator 164 may calculate the correlations of the on-device engines 10*a*-10*c* based on the first state group, for example the on-device state group.

When it is identified that a user voice is related to the server engines 20A-20D, the engine-state correlation calculator 164 may calculate the correlations of the server engines 20A-20D based on the second state group, for example the server state group.

In embodiments, the engine-state correlation calculator 164 may calculate the correlations based on information about all states without selectively using the first state group and the second state group.

The engine candidate group identifier 165 shown in FIG. 3 may select the engine having the highest correlation among the engines having the correlations calculated as above, a predetermined number of engines in order of high correlations, or the engine, or engines, of which the correlations are greater than a predetermined threshold.

The speech recognizer 166 shown in FIG. 3 is configured to perform voice recognition by transmitting a user voice to the engine, or engines, selected in the engine candidate group identifier 165 or selected by the engine selection rule.

The function implementer 167 shown in FIG. 3 may carry out a recognition result of the selected engine, or engines, for example, implement the function of the electronic device 1, output the result, store the result, or transmit the result to an external apparatus.

The function implementer 167 shown in FIG. 3 may configured to store a history of recognition processing results in a history DB.

The correlation adjuster 168 shown in FIG. 3 may be configured to adjust the weight of the correlation of the second reference data 500 in the reference data DB by reflecting a processing result based on a recognition result of the selected engine. The amount of adjusting the correlation may be previously set. In this case, the correlation adjustment may be performed by receiving feedback on a user's satisfaction or when execution is repeated a predetermined number of times.

The correlation adjuster 168 shown in FIG. 3 may be configured to decrease the correlation of the second reference data 500 in the reference data DB when the selected engine does not recognize a user voice and rejects the recognition. In this case, to prevent the engine, which rejects the recognition, from being selected again, the decrease in the correlation may be adjusted in larger units than those of increase in the correlation.

The rule generator 169 shown in FIG. 3 may generate combination of intent-state-engine, which repetitively shows the same results a predetermined number of times, for example, 50 times as shown in FIG. 6 based on the history data stored in the history DB, as an engine selection rule.

Below, examples will be described in which the processor 16 according to an embodiment of the disclosure selects one among the plurality of engines to process a user voice.

Figure 7:
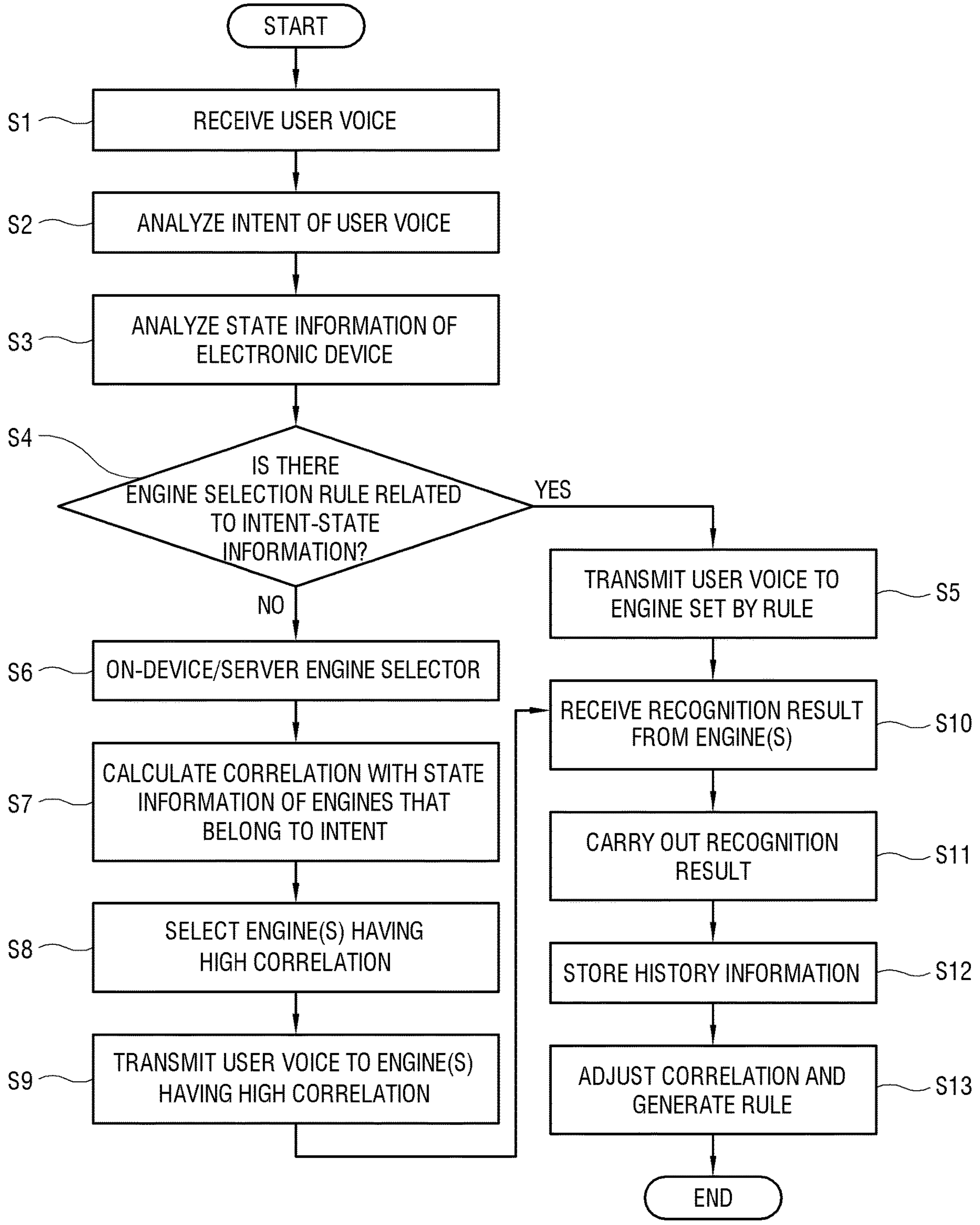
FIG. 7 is a flowchart of a method of controlling the electronic device according to the first embodiment of the disclosure.

FIG. 7 is a flowchart of a method of controlling the electronic device 1 according to the first embodiment of the disclosure.

As shown in FIG. 7, the following operations are performed by the processor 16 of the electronic device 1. Further, the electronic device 1 includes the on-device engines 10*a*-10*c* and the server engines 20A-20D.

At operation S1, the electronic device 1 receives a user voice input.

At operation S2, the electronic device 1 analyzes the intent of the received user voice. The intent of the user voice may be analyzed by the default engine provided inside or outside the electronic device 1. The default engine obtains a text of a user voice, obtains one or more keywords, which constitute the obtained text, from the corresponding text, searches for intents matching one or more keywords in the intent DB, and obtains the intent of the user voice. The intent DB may be a table in which various intents are tabulated matching at least one keyword.

At operation S3, the electronic device 1 analyzes the state information of the item related to the electronic device 1. The items related to the electronic device 1 may include at least one of the power state, the network state, the account-login state, the voice speaker, the voice input route, the trigger presence, or the application state as shown in FIG. 5.

At operation S4, the electronic device 1 identifies whether there is an engine selection rule related to the intent and the state information analyzed with reference to the third reference data 600 of FIG. 6.

At operation S5, when it is identified that the engine selection rule is present, the electronic device 1 transmits a user voice to the engine designated in the rule while skipping the operations for selecting the optimal engine.

At operation S6, the electronic device 1 selects one of the on-device engines or the server engines when it is identified that the engine selection rule is absent. In embodiments, the on-device engine or the server engine may be considered subsets of the engines. In embodiments, the electronic device 1 may use other characteristics of the engines to select any other desired subset of the engines. To select one of the on-device engines or the server engines, the first reference data 400 of FIG. 4 or the second reference data 500 of FIG. 5 may be used.

At operation S7, the electronic device 1 calculates the sum of state information correlations of the engine, or engines, which belongs to the selected subset, for example the one of the on-device engines or the server engines, based on the second reference data 500 of FIG. 5.

At operation S8, the electronic device 1 selects one or a plurality of engines, of which the sum of state information correlations of the engine, or engines, that belongs to one of the on-device engine or the server engine is high.

At operation S9, the electronic device 1 transmits to one selected engine or the plurality of selected engines.

At operation S10, the electronic device 1 receives a recognition result from one selected engine or the plurality of selected engines.

At operation S11, the electronic device 1 carries out a recognition result of one selected engine or the plurality of selected engines. The electronic device 1 may directly carry out a recognition result received from one engine, and may select and carry out a recognition result of the engine, which is received the earliest, among the plurality of engines that transmit the recognition results. When the recognition results from the plurality of engines are arrived at the same time or different from each other, the electronic device 1 may display a plurality of recognition results so that a user can select one of them, or may select and carry out a recognition result based on a preset rule, for example, history information or selection information of another user.

At operation S12, the electronic device 1 controls the storage 14 to store history information about receiving a user voice, selecting the engine, and carry out the recognition results.

At operation S13, the electronic device 1 may adjust the weight of the state information correlation to be decreased or increased with regard to the engine that performs recognition and execution or the engine that rejects the recognition. The electronic device 1 may generate an engine selection rule made with the intent-state information-engine based on history information accumulated a predetermined number of times.

Thus, the electronic device 1 selects one of the on-device engine or the server engine, which is suitable for the intent of the user voice and/or the state of the electronic device 1, calculates the sum of correlations between the states of the electronic device with regard to the engines that belong to one of the on-device engine or the server engine, and selects the engine, of which the sum of correlations is high, to perform recognition. In particular, the electronic device 1 skips a complicated selecting procedure by accumulating repetitive engine selection history data based on state information, and rapidly and accurately recognizes a user voice by generating a rule for directly selecting the engine based on the intent of the user voice and the state information of the electronic device.

As described above, it is possible to solve a problem that an engine unsuitable for conditions is selected to perform recognition, such as a case where a server engine is selected to recognize a user voice of a power control command issued under the condition that the electronic device 1 is for example in the power-off state and the network-offline state.

In embodiments, the electronic device 1 may select an optimal engine with reference to an engine of which recognition is quick, an engine which is selected by a user, an engine of which selection has been recorded in a previous history information, an engine which has been selected by another user, etc. among the plurality of engines having the same or similar correlations.

In embodiments, the electronic device 1 may increase or decrease the correlation of FIG. 5 by mirroring engine selection, successful processing results, failed processing results, recognition-rejection results, and the like experience based on information about the intent of the user voice and/or the state of the electronic device 1.

In embodiments, the processor 16 of the electronic device 1 may use at least one of machine learning, a neural network, or a deep learning algorithm as a rule-based or AI algorithm to perform at least part of data analysis, processing, and result information generation so as to carry out operations of obtaining an intent of a user voice as described above, identifying the engine having a high correlation with the state based on previously defined information about the correlations between the plurality of engines and the states of the electronic device 1, and recognizing the user voice based on the identified engine.

For example, the processor of the electronic device may function as both a learner and a recognizer. The learner may implement a function of generating the learned neural network, and the recognizer may implement a function of recognizing (or deducing, predicting, estimating and identifying) the data based on the learned neural network. The learner may generate or update the neural network. The learner may obtain learning data to generate the neural network. For example, the learner may obtain the learning data from the storage of the electronic device or from the outside. The learning data may be data used for learning the neural network, and the data subjected to the foregoing operations may be used as the learning data to make the neural network learn.

Before making the neural network learn based on the learning data, the learner may perform a preprocessing operation with regard to the obtained learning data or select data to be used in learning among a plurality of pieces of the learning data. For example, the learner may process the learning data to have a preset format, apply filtering to the learning data, or process the learning data to be suitable for the learning by adding/removing noise to/from the learning data. The learner may use the preprocessed learning data for generating the neural network which is set to perform the operations.

The learned neural network may include a plurality of neural networks (or layers). The nodes of the plurality of neural networks have weight values, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

In embodiments, the recognizer may obtain target data to carry out the foregoing operations. The target data may be obtained from the storage of the electronic device or from the outside. The target data may be data targeted to be recognized by the neural network. Before applying the target data to the learned neural network, the recognizer may perform a preprocessing operation with respect to the obtained target data, or select data to be used in recognition among a plurality of pieces of target data. For example, the recognizer may process the target data to have a preset format, apply filtering to the target data, or process the target data into data suitable for recognition by adding/removing noise. The recognizer may obtain an output value output from the neural network by applying the preprocessed target data to the neural network. Further, the recognizer may obtain a stochastic value or a reliability value together with the output value.

The foregoing embodiment describes an example in which the electronic device 1 analyzes the intent of the user voice and the state of the electronic device 1, and finally selects the engine having the highest sum by comparing the sums of correlations related to the state of the electronic device 1 in units of engines. However, the method in which the electronic device 1 selects one engine based on the sum of correlations is not limited to just the comparison between the correlation sums, but may include various methods.

For example, in the foregoing embodiment, the correlations are given to a degree of relationship between the engines and the analyzed state of the electronic device 1, and then just summed up. However, weight may be additionally given to the state information identified to be more important.

Figure 8:
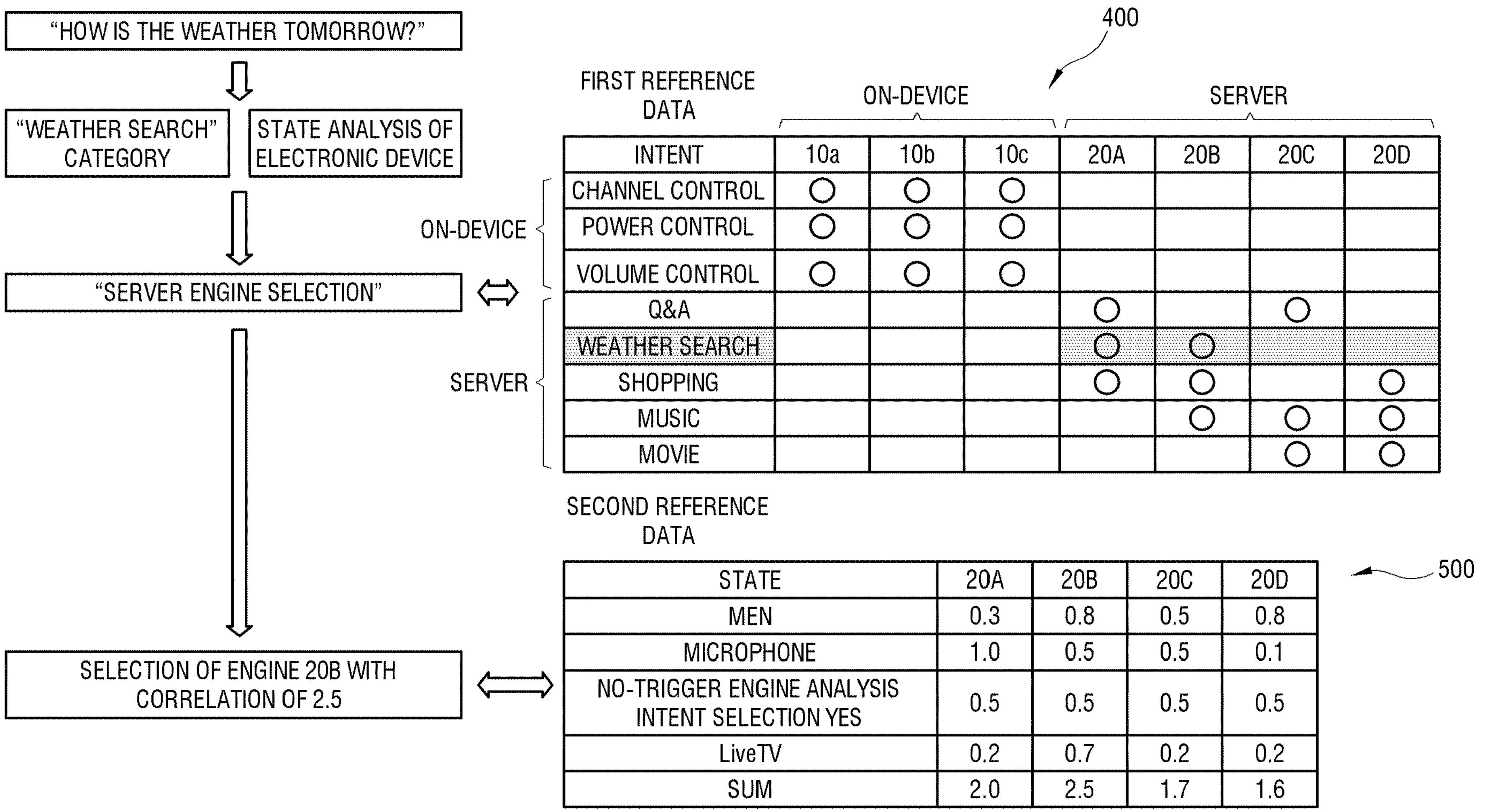
FIG. 8 shows a first example in which the electronic device selects an engine based on the first reference data and the second reference data, according to an embodiment.

FIG. 8 shows a first example in which the electronic device selects an engine based on the first reference data 400 and the second reference data 500.

As shown in FIG. 8, when a user voice of "how is the weather tomorrow?" is received, the intent of the user voice and the state of the electronic device 1 are analyzed.

The default engine may obtain an intent of "weather search" based on words of "weather" and "how".

Further, the electronic device 1 may identify its own states at a point in time when the user voice is received, for example, "power-ON, the network-online, account-login-absence, the speaker-men, the voice route-microphone, the trigger-no-trigger engine analysis intent selection YES, the execution app-LiveTV".

The electronic device 1 may select a subset of the engines, for example the server engines 20A-20D, because the intent of "weather search" belongs to the second intent group in the first reference data 400 of FIG. 4.

The electronic device 1 may calculate the correlation sums of the server engines 20A-20D with regard to the state information corresponding to the second state group of FIG. 5, such as "the speaker-men, the voice route-microphone, the trigger-no-trigger engine analysis intent selection YES, and the execution app-LiveTV."

The correlation sums of the server engines 20A-20D are '2.0', '2.5', '1.7' and '1.6', respectively. Therefore, the electronic device 1 selects the engine 20B of which the correlation sum is '2.5'.

As described above, when a user voice is received, the electronic device 1 analyzes the intent and the state of the electronic device 1, selects the on-device engine or the server engine based on the intent, calculates the state information and the correlation sums with regard to the selected engines, and finally selects the engine having the highest correlation sum to recognize the user voice.

Figure 9:
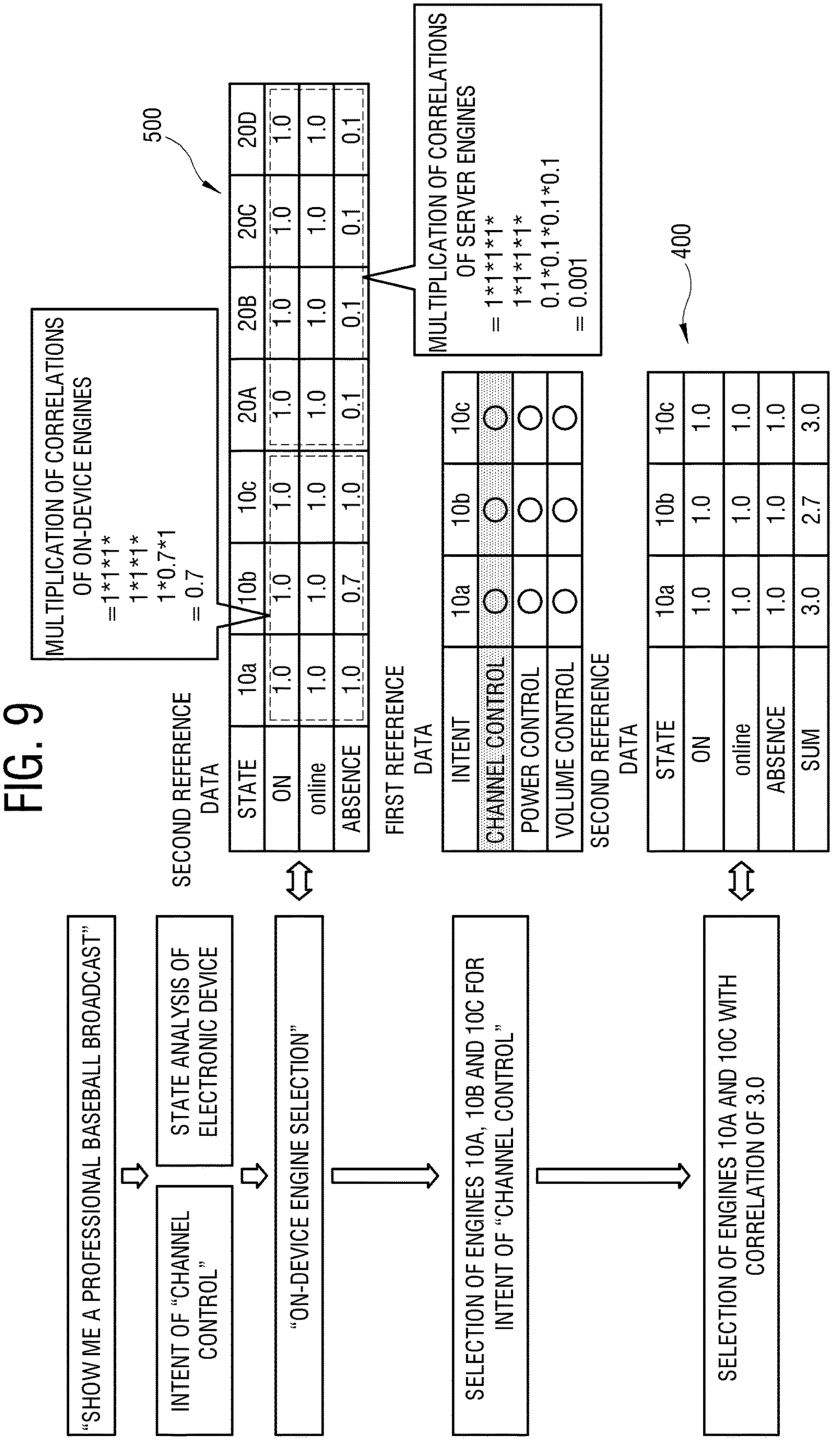
FIG. 9 shows a second example in which the electronic device selects an engine based on the first reference data and the second reference data, according to an embodiment.

FIG. 9 shows a second example in which the electronic device 1 selects an engine based on the first reference data 400 and the second reference data 500.

As shown in FIG. 9, when a user voice of "show me a professional baseball broadcast" is received, the intent of the user voice and the state of the electronic device 1 are analyzed.

The default engine may obtain an intent of "channel control" based on words of "broadcast" and "show".

Further, the electronic device 1 may identify its own states at a point in time when the user voice is received, for example, "power-ON, the network-online, account-login-absence, the speaker-men, the voice route-microphone, the trigger-trigger engine analysis intent selection YES, the execution app-LiveTV."

The electronic device 1 multiplies all the correlations of the on-device engines 10*a*-10*c* and multiplies all the correlations of the server engines 20A-20D with regard to the items of "power state", "network state" and "account-login state" in the second reference data 500 of FIG. 5. 0.7 (=1*1*1*1*1*0.7*1*1*1) is obtained by multiplying the correlations of the on-device engines 10*a*-10*c*, and 0.001 (=1*1*1*1*1*1*1*1*0.1*0.1*0.1*0.1) is obtained by multiplying the correlations of the server engines 20A-20D. Here, the correlation may be calculated based on the correlations of the items of "the voice speaker", "the voice route", "trigger" and "app running state" in addition to the items of "power state", "network state", "account-login state". To select one of the on-device engine and the server engine, the sum of the correlations may be employed instead of the multiplication of the correlations.

The electronic device 1 selects the on-device engines 10*a*-10*c* having a higher value obtained by multiplying the correlations.

The electronic device 1 selects the engine 10*a*, the engine 10*b* and the engine 10*c* related to the intent of "channel control" among the on-device engines 10*a*-10*c* based on the first reference data 400 of FIG. 4. If only the engine 10*a* is related to the intent of "channel control" among the on-device engines 10*a*-10*c*, only the engine 10*a* is selected.

The electronic device 1 may calculate the correlation sums of the engine 10*a*, the engine 10*b* and the engine 10*c* selected with regard to the state information corresponding to the second reference data 500 of FIG. 5, such as "power-ON, the network-online, and account-login-absence".

The correlation sums of the engine 10*a*, the engine 10*b* and the engine 10*c* are '3.0', '2.7', '3.0'. Therefore, the electronic device 1 selects the engine 10*a* and the engine 10*c* of which the correlation sum is '3.0'.

When the plurality of engines have the same correlation, the electronic device 1 may transmit the user voice to all the plurality of engines, thereby allowing all the plurality of engines to perform voice recognition, allowing a user to select the engine, or allowing only one engine to be selected based on the history information or another user's selection information.

As described above, when a user voice is received, the electronic device 1 analyzes the intent and the state of the electronic device 1, selects the on-device engine or the server engine based on the second reference data 500, selects the engine that belongs to the intent of the user voice, calculates the correlation sums with regard to the selected engines, and finally selects the engine having the highest correlation sum to recognize the user voice.

Figure 10:
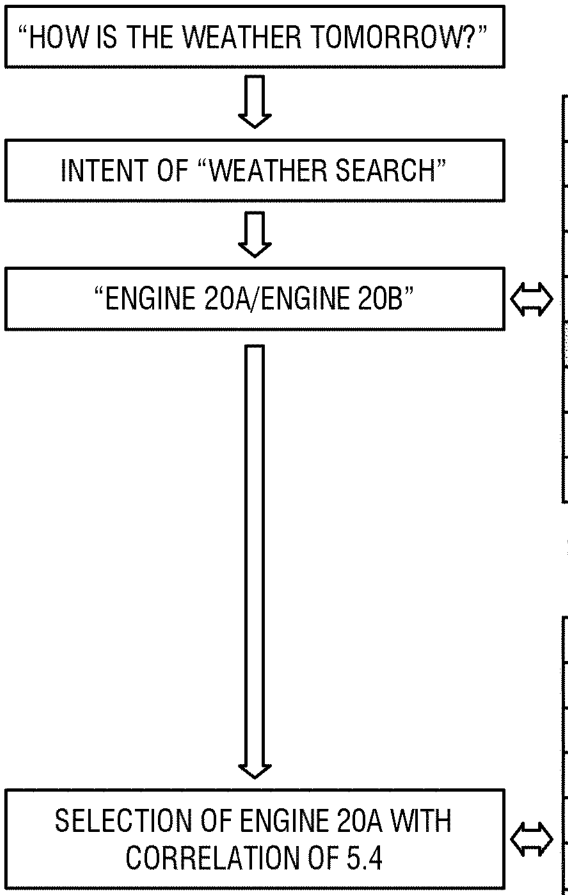
FIG. 10 shows a third example in which the electronic device selects an engine based on the first reference data and the second reference data, according to an embodiment.

FIG. 10 shows a third example in which the electronic device 1 selects an engine based on the first reference data 400 and the second reference data 500.

As shown in FIG. 10, when a user voice of "how is the weather tomorrow?" is received, the intent of the user voice and the state of the electronic device 1 are analyzed.

The default engine may obtain an intent of "weather search" based on words of "weather" and "how".

Further, the electronic device 1 may identify its own states at a point in time when a user voice is received, for example, "power-ON, the network-online, account-login-absence, the speaker-men, the voice route-microphone, the trigger-trigger engine analysis intent selection YES, the execution app-Web".

The electronic device 1 may select the engine 20A and the engine 20B to which the intent of "weather search" belongs in the first reference data 400 of FIG. 4.

The electronic device 1 may calculate the correlation sums of the engine 20A and the engine 20B with regard to the "power-ON, the network-online, account-login-absence, the speaker-men, the voice route-microphone, the trigger-trigger engine analysis intent selection YES, the execution app-Web" of FIG. 5.

The correlation sums of the engine 20A and the engine 20B are '5.4' and '4.7', respectively. Therefore, the electronic device 1 selects the engine 20A of which the correlation sum is '5.4'.

As described above, when a user voice is received, the electronic device 1 analyzes the intent and the state of the electronic device 1, selects the engine related to the intent, calculates the state information and the correlation sum with regard to the selected engines, and finally selects the engine having the highest correlation sum to recognize the user voice.

Figure 11:
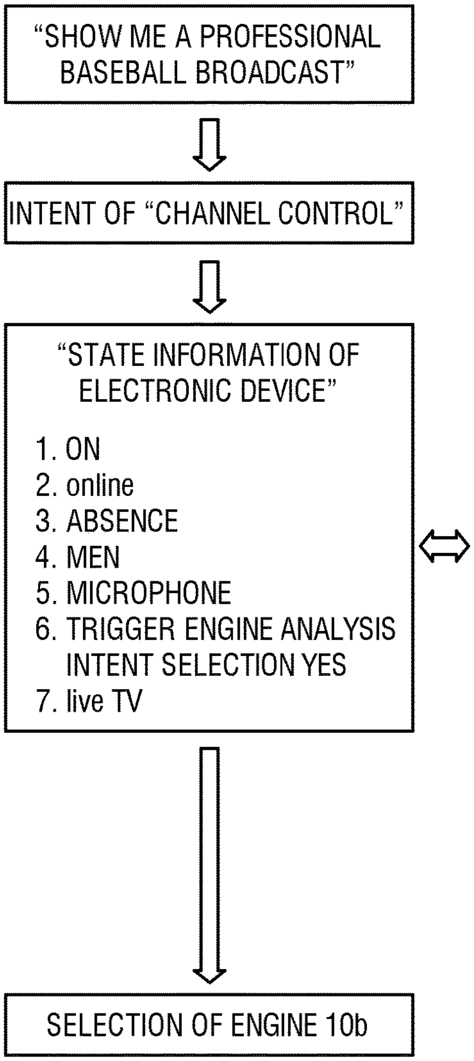
FIG. 11 shows an example in which the electronic device selects an engine based on the third reference data, according to an embodiment.

FIG. 11 shows an example in which the electronic device 1 selects an engine based on the third reference data 600.

As shown in FIG. 11, when a user voice of "show me a professional baseball broadcast" is received, the intent of the user voice and the state of the electronic device 1 are analyzed.

The default engine may obtain an intent of "channel control" based on words of "broadcast" and "show".

Further, the electronic device 1 may identify its own states at a point in time when the user voice is received, for example, "power-ON, the network-online, account-login-absence, the speaker-men, the voice route-microphone, the trigger-trigger engine analysis intent selection YES, the execution app-LiveTV."

The electronic device 1 identifies the engine 10*b* designated by the rule with regard to the channel control intent and "power-ON, the network-online, account-login-absence, the speaker-men, the voice route-microphone, the trigger-trigger engine analysis intent selection YES, the execution app-LiveTV" in the third reference data 600 of FIG. 6.

The electronic device 1 selects the engine 10*b* designated by the rule and transmits the user voice to the engine 10*b*, thereby performing the recognition.

As described above, when a user voice is received, the electronic device 1 analyzes the intent and the state of the electronic device 1, and directly selects an engine when the engine designated by the rule is present in the third reference data 600, thereby recognizing the user voice.

Figure 12:
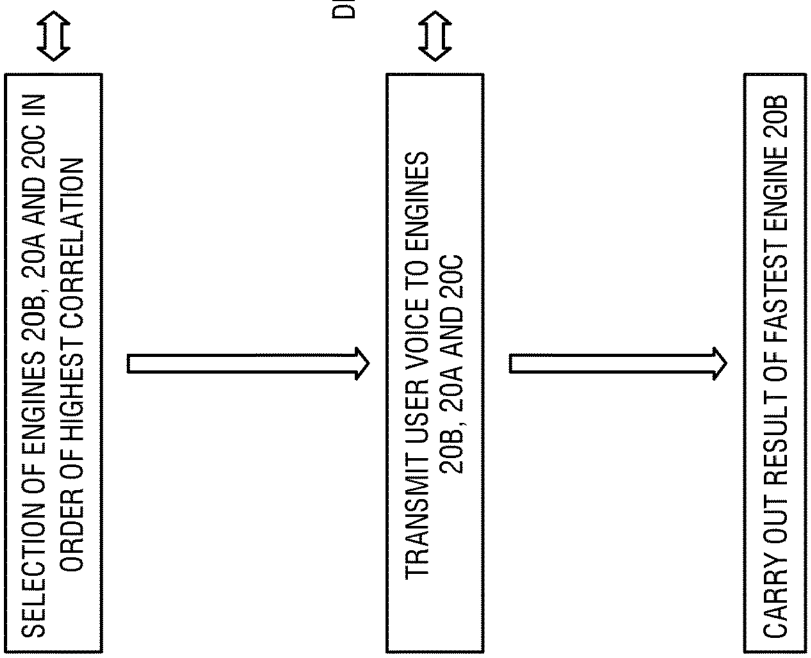
FIG. 12 shows a first example in which the electronic device selects one among a plurality of engines having the same or similar correlation, according to an embodiment.

FIG. 12 shows a first example in which the electronic device 1 selects one among a plurality of engines having the same or similar correlation.

As shown in FIG. 12, the electronic device 1 selects the engine 20B, the engine 20A and the engine 20C in order of the highest sum of correlations with the states of the electronic device 1, such as the "voice speaker", the "voice route", the "trigger", and the "app running state" among the server engines 20A-20D in the second reference data 500 of FIG. 5.

The electronic device 1 transmits the user voice to the engine 20B, the engine 20A and the engine 20C to perform recognition. Then, recognition results were received from the engine 20B after 3 seconds, from the engine 20A after 5 seconds, and from the engine 20C after 10 seconds.

The electronic device 1 carries out the recognition results of the engine 20B that gives the recognition results the fastest.

As described above, the electronic device 1 selects the plurality of engines in order of the same or highest correlation sum, transmits the user voice to the selected engines at the same time, and selects and carries out only the recognition results of the engine that gives the recognition results the fastest.

Figure 13:
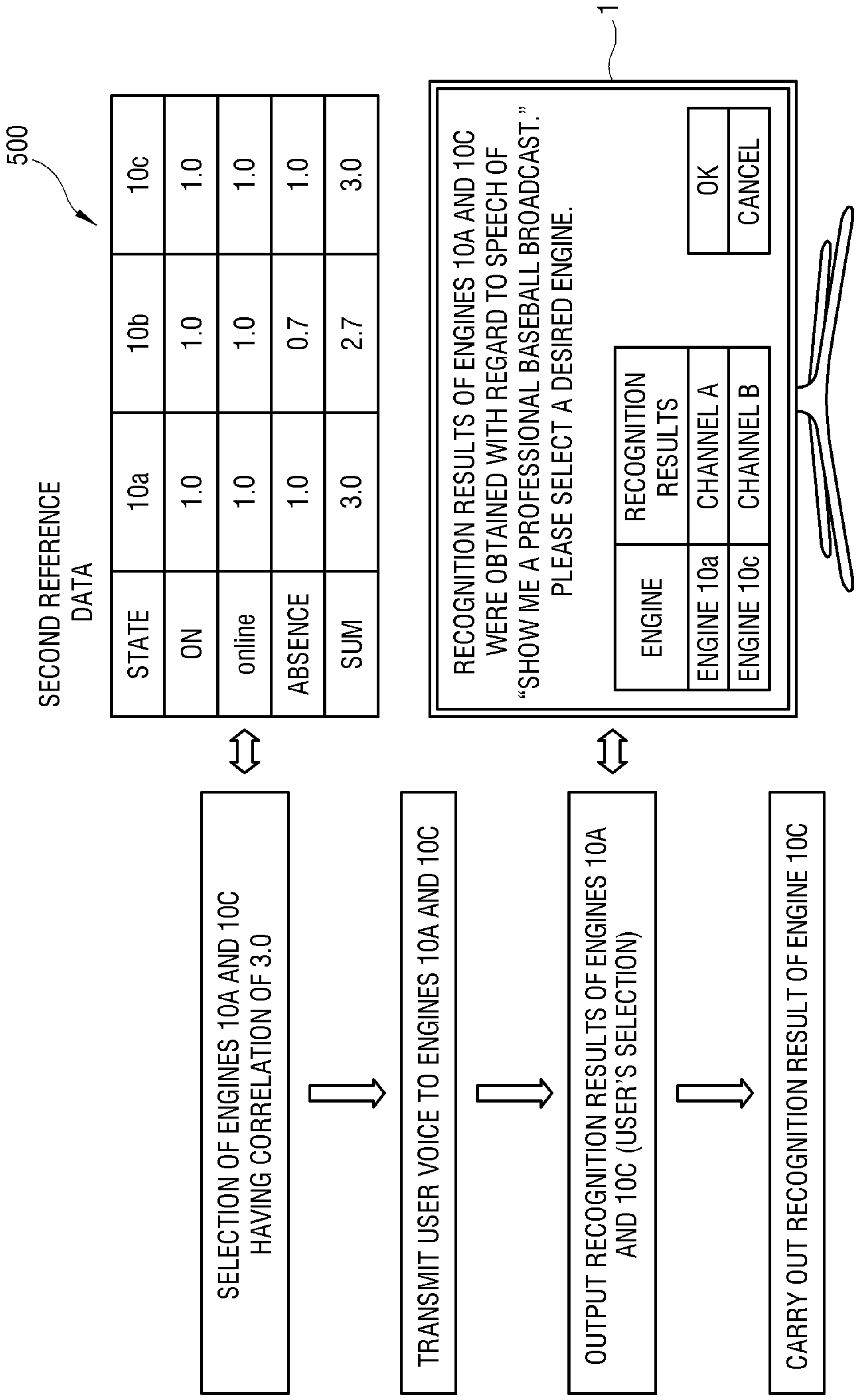
FIG. 13 shows a second example in which the electronic device selects one among a plurality of engines having the same or similar correlation, according to an embodiment.

FIG. 13 shows a second example in which the electronic device 1 selects one among a plurality of engines having the same or similar correlation.

As shown in FIG. 13, the electronic device 1 selects the engine 10*a* and the engine 10*c* in order of the highest sum of correlations with the states of the electronic device 1 such as the "power state", the "network state" and the "account-login state" among the on-device engines 10*a*-10*c* in the second reference data 500 of FIG. 5.

The electronic device 1 transmits the user voice to the engine 10*a* and the engine 10*c* to perform recognition.

The electronic device 1 receives the recognition results of "channel A" and "channel B" from the engine 10*a* and the engine 10*c*, and provides a user selection user interface (UI) to the display 12. When the engine 10*a* and the engine 10*c* give the same recognition result, the recognition result of the engine, which is received the earliest, is carried out as shown in FIG. 12.

When a user selects the engine 10*c* through the user section UI, the electronic device 1 sets a channel with the channel B.

As described above, the electronic device 1 selects the plurality of engines in order of the same or highest correlation sum, transmits the user voice to the selected engines at the same time, and carries out the recognition result of the engine selected by a user when the selected engines give the different recognition results.

Figure 14:
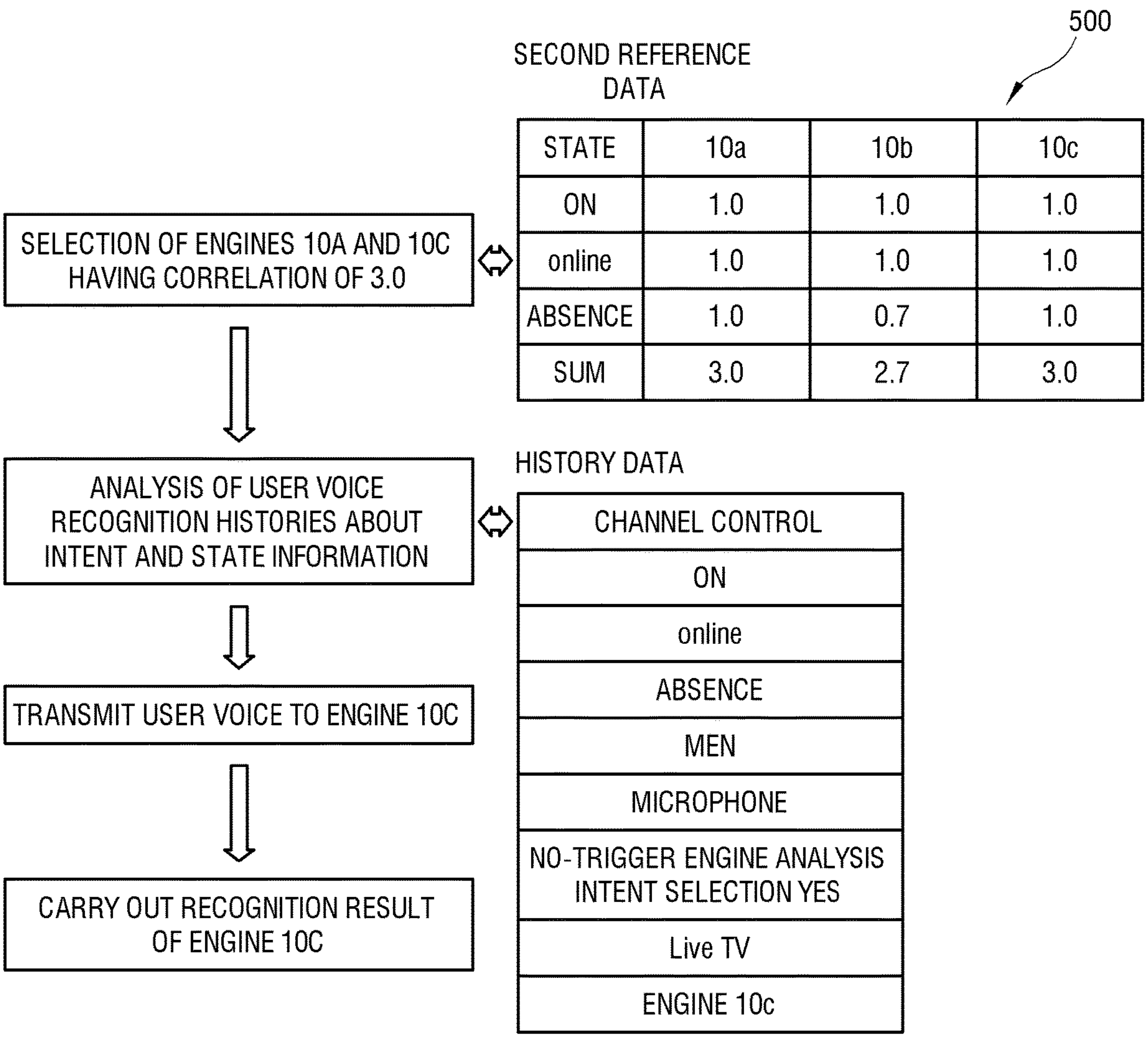
FIG. 14 shows a third example in which the electronic device selects one among a plurality of engines having the same or similar correlation, according to an embodiment.

FIG. 14 shows a third example in which the electronic device 1 selects one among a plurality of engines having the same or similar correlation.

As shown in FIG. 14, the electronic device 1 selects the engine 10*a* and the engine 10*c* in order of the highest sum of correlations with the states of the electronic device 1 such as the "power state", the "network state" and the "account-login state" among the on-device engines 10*a*-10*c* in the second reference data 500 of FIG. 5.

The electronic device 1 analyzes a history of recognizing the intent of "channel control" and the state information of "the power-ON, the network-online, the account-login-absence, the speaker-men, the voice route-microphone, the trigger-no-trigger engine analysis intent selection YES, and the execution app-LiveTV".

The electronic device 1 selects the engine 10_c_, which has recognized and processed the information about the intent of the user voice and the state of the electronic device 1, in history data of FIG. 14, and transmits the user voice to the selected engine 10_c_ to perform recognition. Here, the history data refers to a table in which engines suitable for the intents of the user voice and the states of the electronic device 1 are selected and tabulated matching a history of successful recognitions, a history of failed recognitions, a history of rejecting the recognition, etc. Like this, the history data may be used as data for selecting one among the plurality of engines having the same or similar correlation, or as data for generating an engine selection rule.

The electronic device 1 carries out the recognition result of the engine 10_c_.

As described above, the electronic device 1 selects the plurality of engines in order of the same or high correlation sum, analyzes the history of the intents and the state information, and carries out the recognition result of the previously used engine.

Figure 15:
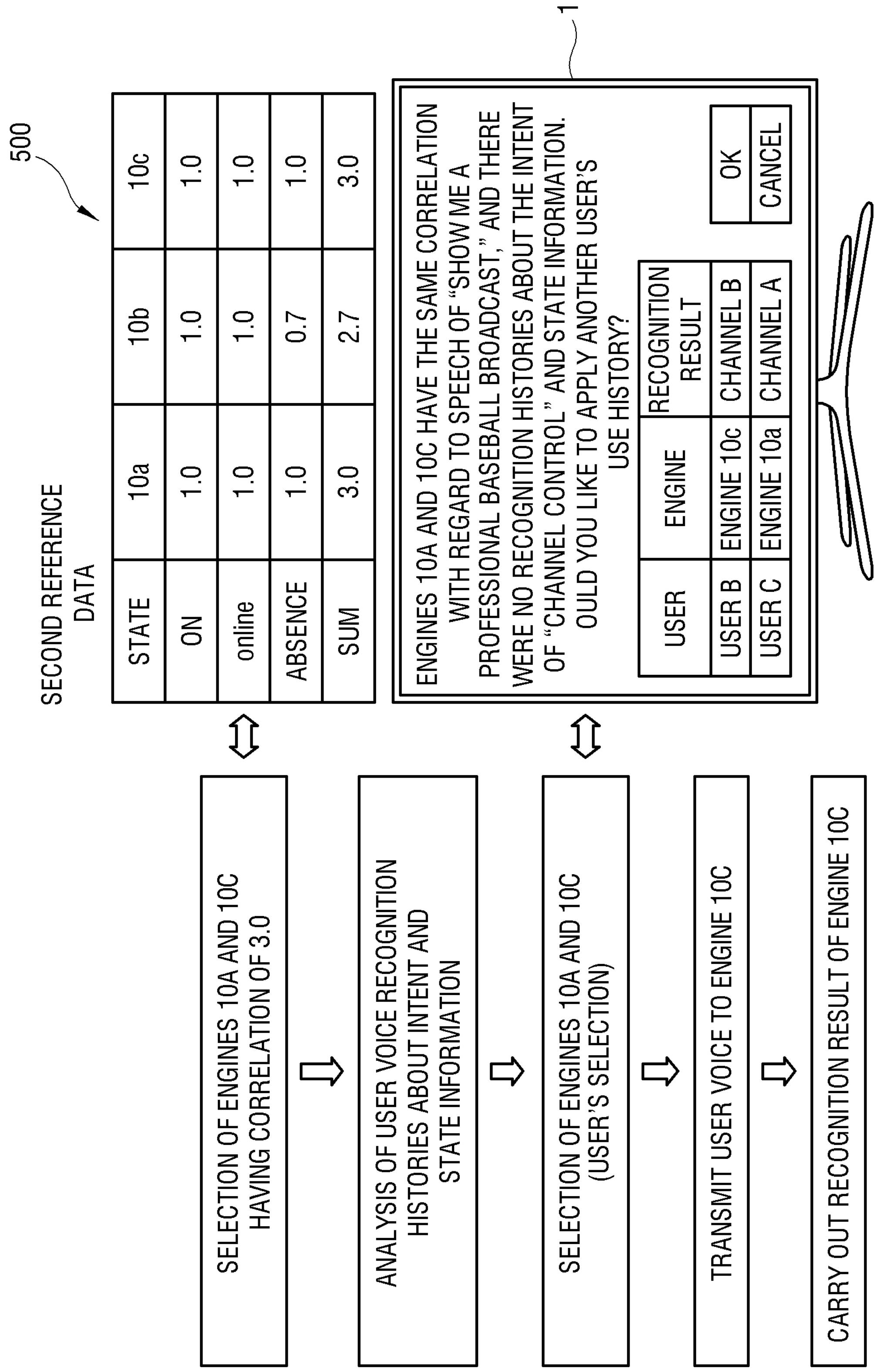
FIG. 15 shows a fourth example in which the electronic device selects one among a plurality of engines having the same or similar correlation, according to an embodiment.

FIG. 15 shows a fourth example in which the electronic device 1 selects one among a plurality of engines having the same or similar correlation.

As shown in FIG. 15, the electronic device 1 selects the engine 10_a_ and the engine 10_c_ in order of the highest sum of correlations with the states of the electronic device 1 such as "the power state", the "network state" and the "account-login state" among the on-device engines 10_a_-10_c_ in the second reference data 500 of FIG. 5.

The electronic device 1 analyzes a history of recognizing the intent of "channel control" and the state information of "the power-ON, the network-online, the account-login-absence, the speaker-men, the voice route-microphone, the trigger-no-trigger engine analysis intent selection YES, and the execution app-LiveTV".

When there are no histories of recognizing the intent of "channel control" and the state information in the history data, the electronic device 1 identifies a use history of another user.

The electronic device 1 outputs recognition histories of a user B and a user C about the same intent and state information as shown in FIG. 15, thereby allowing a user to select the recognition history. The user may select the engine 10_c_ corresponding to the recognition result of "channel B" of the user B.

The electronic device 1 transmits the user voice to the engine 10_c_ selected by a user.

The electronic device 1 carries out the recognition result of the engine 10_c_.

As described above, the electronic device 1 selects the plurality of engines in order of the same or high correlation sum, and selects the suitable engine with reference to the recognition histories of other users as well as the history of the intents and the state information.

Figure 16:
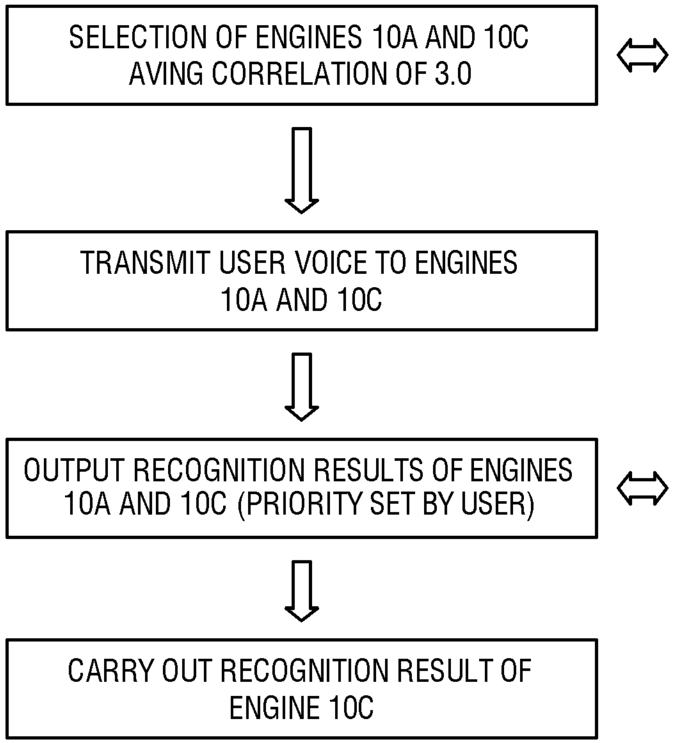
FIG. 16 shows a fifth example in which the electronic device 1 selects one among a plurality of engines having the same or similar correlation, according to an embodiment.

FIG. 16 shows a fifth example in which the electronic device 1 selects one among a plurality of engines having the same or similar correlation.

As shown in FIG. 16, the electronic device 1 selects the engine 10_a_ and the engine 10_c_ in order of the highest sum of correlations with the states of the electronic device 1 such as the "power state", the "network state" and the "account-login state" among the on-device engines 10_a_-10_c_ in the second reference data 500. In this case, the second reference data 500 may include selection priority with regard to the on-device engines 10_a_-10_c_ previously set by a user.

The electronic device 1 transmits the user voice to the engine 10_a_ and the engine 10_c_ to thereby perform recognition.

When the electronic device 1 receives the same recognition results of "channel A" from the engine 10_a_ and the engine 10_c_, the recognition result of the engine 10_c_ having high priority may be selected with reference to the selection priority set by a user in the second reference data 500.

The electronic device 1 sets a channel with the channel A when the engine 10_c_ is selected based on the selection priority set by the user.

In the foregoing embodiment, the electronic device 1 may select the engine 10_c_ having the highest priority in the selection priority set by a user, instead of selecting two engines of the engine 10_a_ and the engine 10_c_ having the same correlation sum.

As described above, the electronic device 1 may select an engine based on a priority previously set by a user when the engines have the same correlation sum and give the same recognition results, thereby carrying out the recognition result of the selected engine.

FIG. 17 shows an example of an update result in which a user voice processing result is reflected by the electronic device 1.

As shown in FIG. 17, the electronic device 1 stores a recognition result of the engine 20_b_ based on the intent and the state information as history data. The recognition result includes the state information of "power-ON, the network-online, account-login-absence, the voice speaker-men, the voice route-microphone, the trigger-no-trigger engine analysis intent selection YES, the execution app-LiveTV", the recognition engine 20B, the user A, the intent of "weather search", and a search result of "cloudy".

The electronic device 1 increases the correlation of the state information related to the engine 20B by '0.1' in the second reference data 500 of FIG. 5 by reflecting a processing result based on the recognition of the selected engine 20B. In this case, the amount of correlation adjustment is not limited to '0.1'. When the amount of correlation adjustment is too high, an unsuitable engine may be selected. On the other hand, when the amount of correlation adjustment is too low, an effect of adjustment may be insufficient. Therefore, there is a need of properly setting the amount of correlation adjustment. The correlation adjustment may be set by getting feedback on a user's satisfaction, or may be set only when processing is repeated a predetermined number of times.

As described above, the electronic device 1 adjusts the correlation of the engine related to the states by reflecting a processing result of recognizing and executing a user voice, thereby improving a processing time for selecting a suitable engine and the accuracy of the selection.

Figure 18:
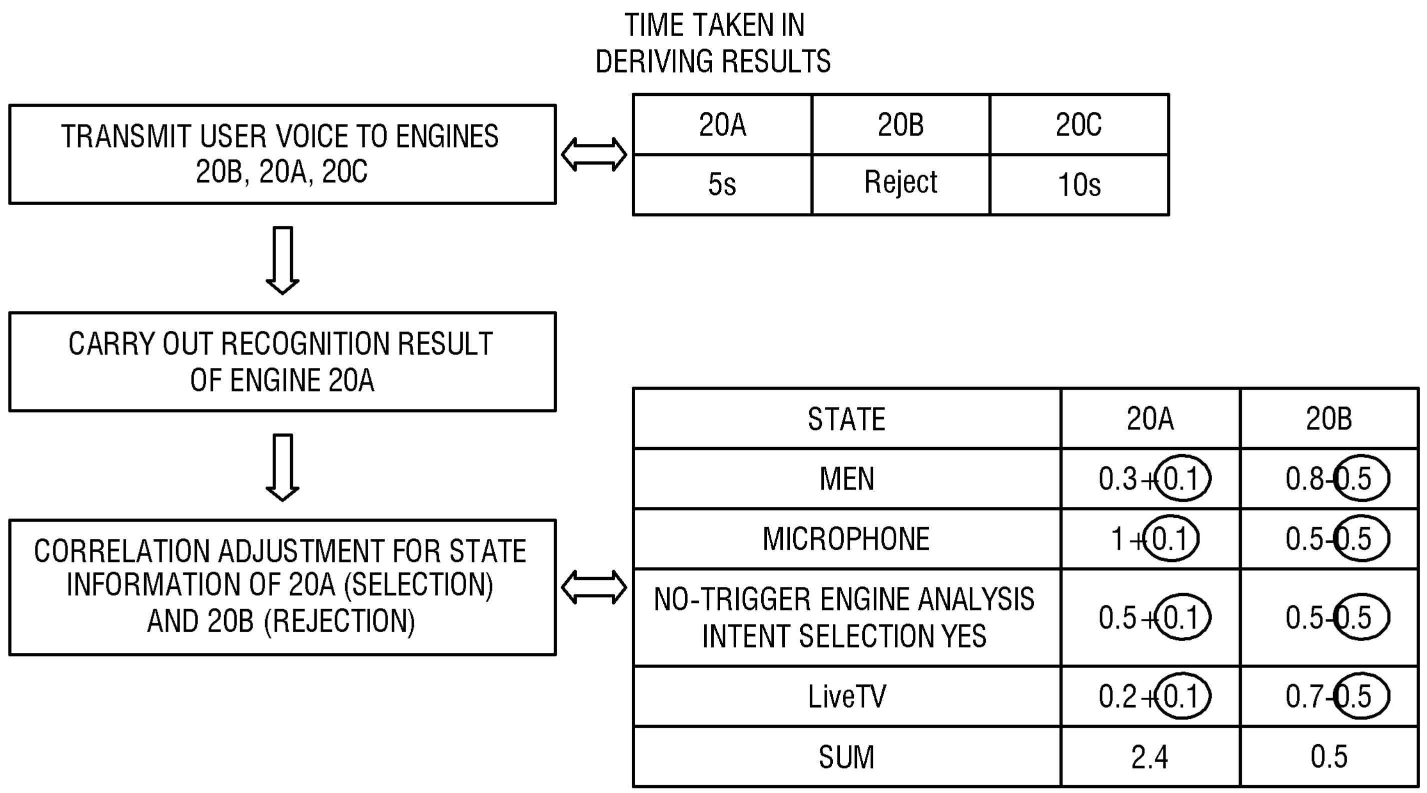
FIG. 18 shows an example of an update result in which a user voice recognition-rejecting result is reflected by the electronic device, according to an embodiment.

FIG. 18 shows an example of an update result in which a user voice recognition-rejecting result is reflected by the electronic device.

The electronic device 1 transmits a user voice to the engine 20A, the engine 20B and the engine 20C selected based on the second reference data 500 of FIG. 5 with regard to the intent of "weather search" and the state information of "the voice speaker-men, the voice route-microphone, the trigger-no-trigger engine analysis intent selection YES, and the execution app-LiveTV".

As shown in FIG. 18, the electronic device 1 receives the recognition results from the engine 20A after 3 seconds and from the engine 20C after 10 seconds, but is rejected by the engine 20B.

The electronic device 1 carries out and processes the recognition result of the engine 20A.

The electronic device 1 increases the correlation of the state information related to the engine 20A by '0.1' in the second reference data 500 of FIG. 5 by reflecting a processing result based on the recognition of the selected engine 20A. The electronic device 1 decreases the correlation of the state information related to the engine 20B by '0.5' in the second reference data 500 of FIG. 5 by reflecting a rejection result of the selected engine 20B. Because the engine 20B that rejected the recognition is significantly decreased in correlation, the engine 20B is not selected again with regard to the same intent and state information.

As described above, the electronic device 1 decreases the correlation of the engine that rejects the recognition of the user voice, thereby preventing an unsuitable engine from being selected.

Figure 19:
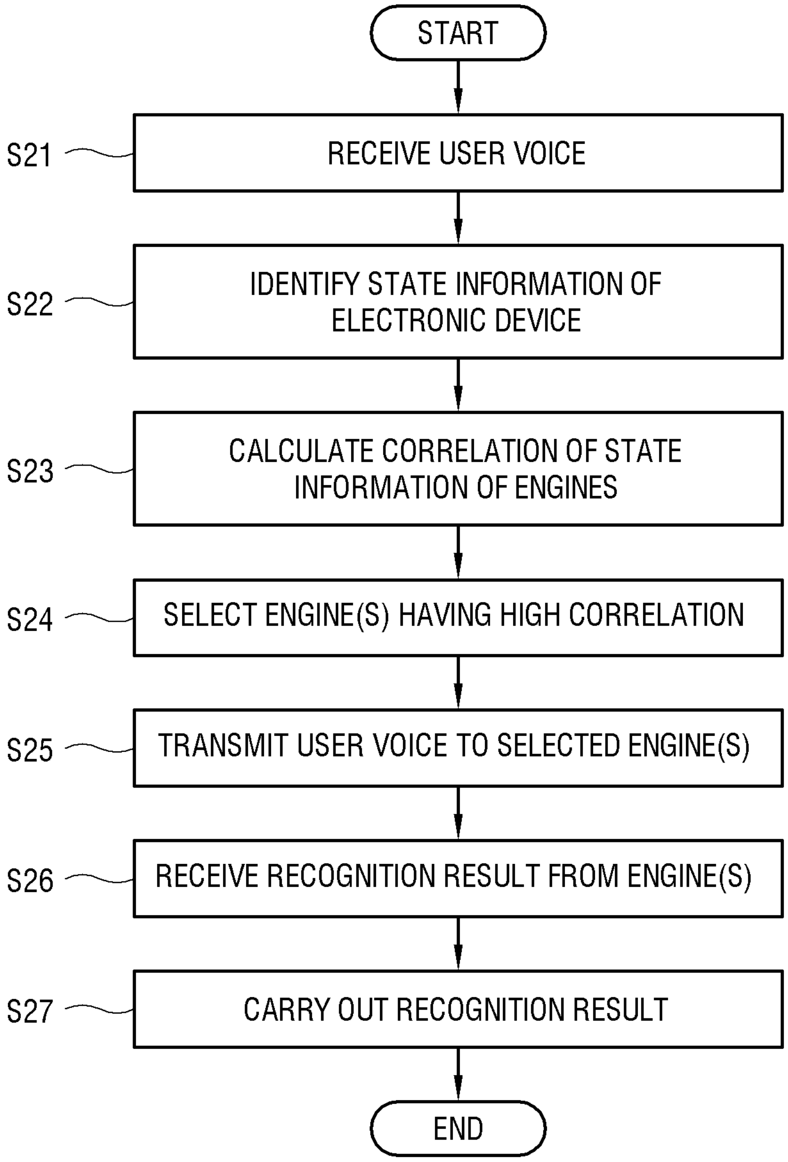
FIG. 19 is a flowchart of a method of controlling an electronic device according to a second embodiment of the disclosure.

FIG. 19 is a flowchart of a method of controlling an electronic device 1 according to a second embodiment of the disclosure. The following operations are performed by the processor 16 of the electronic device 1. The second embodiment shown in FIG. 19 does not previously identify the on-device engine and the server engine unlike the first embodiment of FIG. 7, but selects an optimal engine based on the information about the state of the electronic device 1.

At operation S21, the electronic device 1 receives a user voice.

At operation S22, the electronic device 1 analyzes the state information of the items related to the electronic device 1. The items related to the electronic device 1 may include at least one of the power state, the network state, the account-login state, the voice speaker, the voice input route, the trigger presence, or the application state as shown in FIG. 5.

At operation S23, the electronic device 1 calculates the state information correlations of the engines based on the second reference data 500 of FIG. 5.

At operation S24, the electronic device 1 selects one or a plurality of engines, in which the sums of state information correlations of the engines are high.

At operation S25, the electronic device 1 transmits a user voice to one selected engine or the plurality of selected engines.

At operation S26, the electronic device 1 receives a recognition result from one selected engine or the plurality of selected engines.

At operation S27, the electronic device 1 carries out the recognition result from one selected engine or the plurality of selected engines. The electronic device 1 immediately carries out the recognition result received from one engine, or selectively carries out the first received recognition result of the engine among the recognition results received from the plurality of engines.

Figure 20:
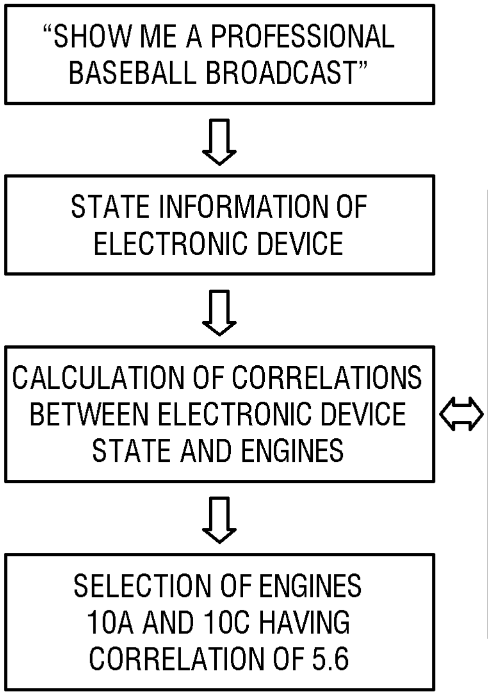
FIG. 20 shows an example in which the electronic device according to the second embodiment of the disclosure selects an engine for recognizing a user voice.

FIG. 20 shows an example in which the electronic device 1 according to the second embodiment of the disclosure selects an engine for recognizing a user voice.

As shown in FIG. 20, when a user voice of "show me a professional baseball broadcast" is received, the state of the electronic device 1 is analyzed with regard to the user voice.

The electronic device 1 may obtain the state information at a point in time when the user voice is received, for example "the power-ON, the network-online, account-login-absence, the speaker-men, the voice route-microphone, the trigger-no-trigger engine analysis intent selection YES, and the execution app-LiveTV".

The electronic device 1 calculates the correlation sums of the engines 10*a*-10*c* and the engines 20A-20D with reference to the second reference data 500 of FIG. 5. The correlation sums of the engines 10*a*-10*c* and the engines 20A-20D are '5.6', '5.3', '5.6', '4.1', '4.6', '3.8' and '3.7', respectively.

The electronic device 1 selects the engine 10*a* and the engine 10*c* of which the correlation sums are '5.6'.

As described above, when a user voice is received, the electronic device 1 analyzes the state of the electronic device 1, calculates the correlation sums related to the states with regard to the engines based on the analyzed state, and finally selects the engine having the highest correlation sum to recognize the user voice.

Figure 21:
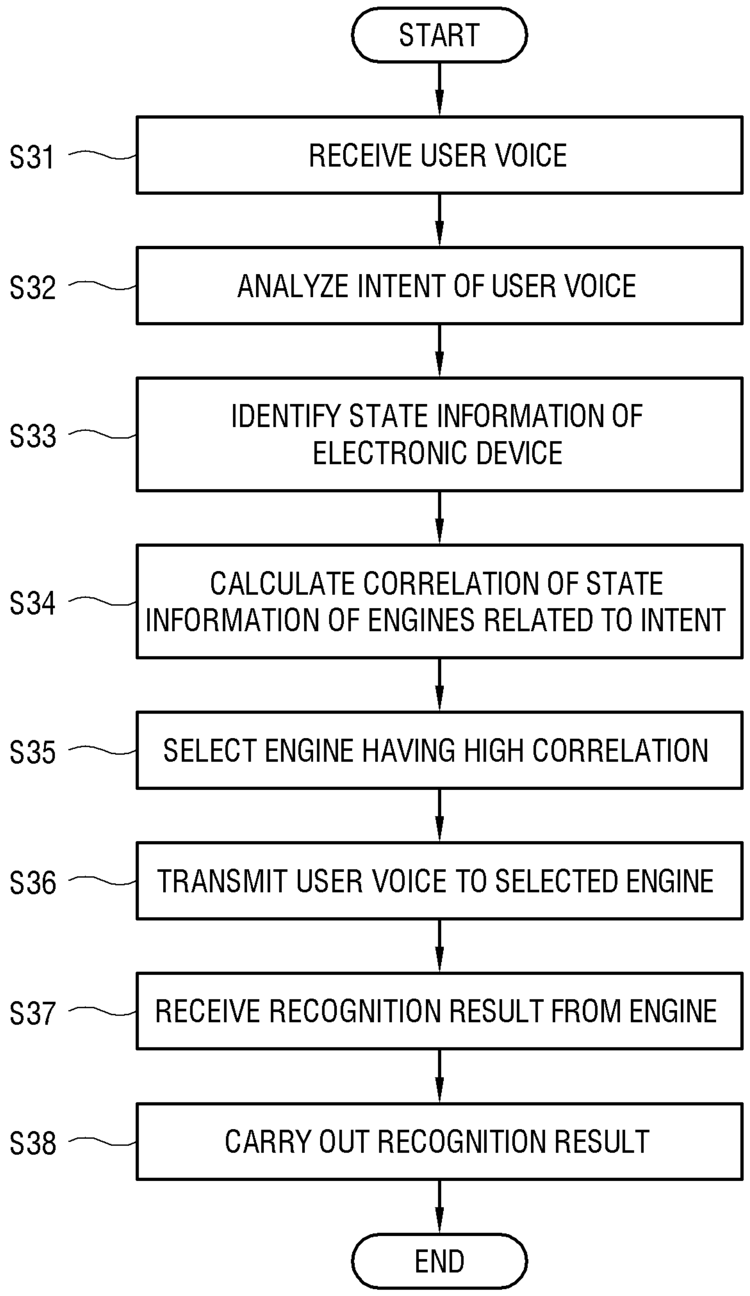
FIG. 21 is a flowchart of a method of controlling an electronic device according to a third embodiment of the disclosure.

FIG. 21 is a flowchart of a method of controlling an electronic device 1 according to a third embodiment of the disclosure. The following operations are performed by the processor 16 of the electronic device 1. The third embodiment shown in FIG. 21 selects an optimal engine based on the intent of the user voice as well as the state information of the electronic device 1, unlike the second embodiment of FIG. 19.

At operation S31, the electronic device 1 receives a user voice.

At operation S32, the electronic device 1 analyzes the intent of the received user voice. The intent of the user voice may be analyzed through the default engine provided inside or outside the electronic device 1.

At operation S33, the electronic device 1 analyzes the state information of the items related to the electronic device 1. The items related to the electronic device 1 may include at least one of the power state, the network state, the account-login state, the voice speaker, the voice input route, the trigger presence or the application state as shown in FIG. 5.

At operation S34, the electronic device 1 selects the engines corresponding to the intent based on the first reference data 400 of FIG. 4, and then calculates the sums of state information correlations based on the second reference data 500 of FIG. 5 with regard to the selected engines.

At operation S35, the electronic device 1 selects one or the plurality of engines, in which the sums of state information correlations of the engines are high.

At operation S36, the electronic device 1 transmits the user voice to one selected engine or the plurality of selected engines.

At operation S37, the electronic device 1 receives recognition results from one selected engine or the plurality of selected engines.

At operation S38, the electronic device 1 carries out the recognition results from one selected engine or the plurality of selected engines.

Figure 22:
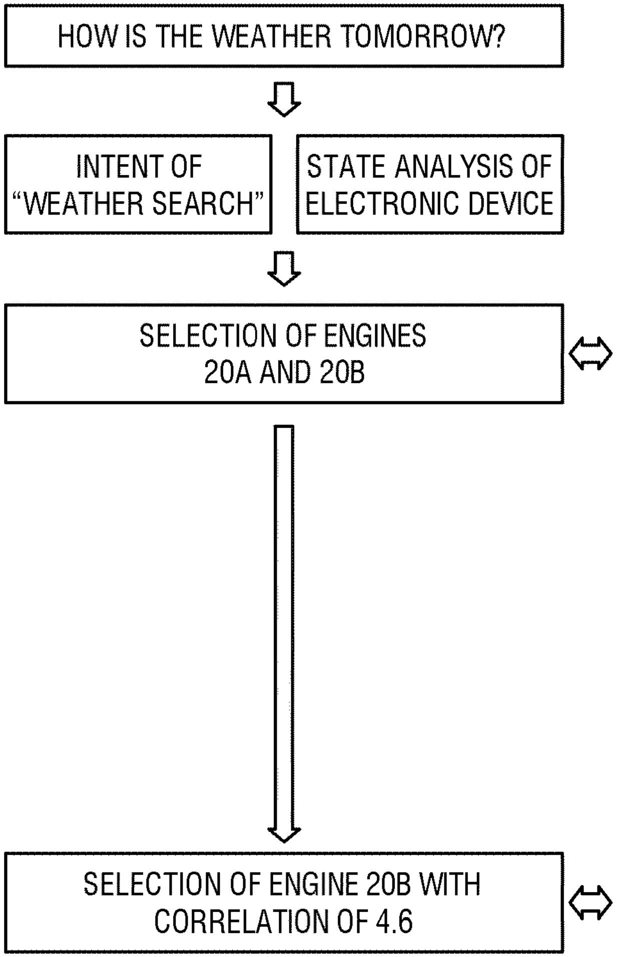
FIG. 22 shows an example in which the electronic device according to the third embodiment of the disclosure selects an engine for recognizing a user voice.

FIG. 22 shows an example in which the electronic device 1 according to the third embodiment of the disclosure selects an engine for recognizing a user voice.

As shown in FIG. 22, when a user voice of "how is the weather tomorrow?" is received, the intent of the user voice and the state of the electronic device 1 are analyzed.

The electronic device 1 may obtain the intent of "weather search" and the state information at a point in time when the user voice is received, for example "power-ON, the network-online, account-login-absence, the voice speaker-men, the voice route-microphone, the trigger-no-trigger engine analysis intent selection YES, and the execution app-LiveTV".

The electronic device 1 selects the engine 20A and the engine 20B corresponding to the intent of "weather search" with reference to the first reference data 400 of FIG. 4.

The electronic device 1 calculates the correlation sums of the engine 20A and the engine 20B based on the second reference data 500 of FIG. 5.

The electronic device 1 selects the engine 20B having a correlation sum of '4.6'.

As described above, when a user voice is received, the electronic device 1 analyzes the intent of the user voice and the state of the electronic device 1, calculates the correlation sums related to the states with regard to the engines selected corresponding to the intent, and finally selects the engine having the highest correlation sum to recognize the user voice.

Figure 23:
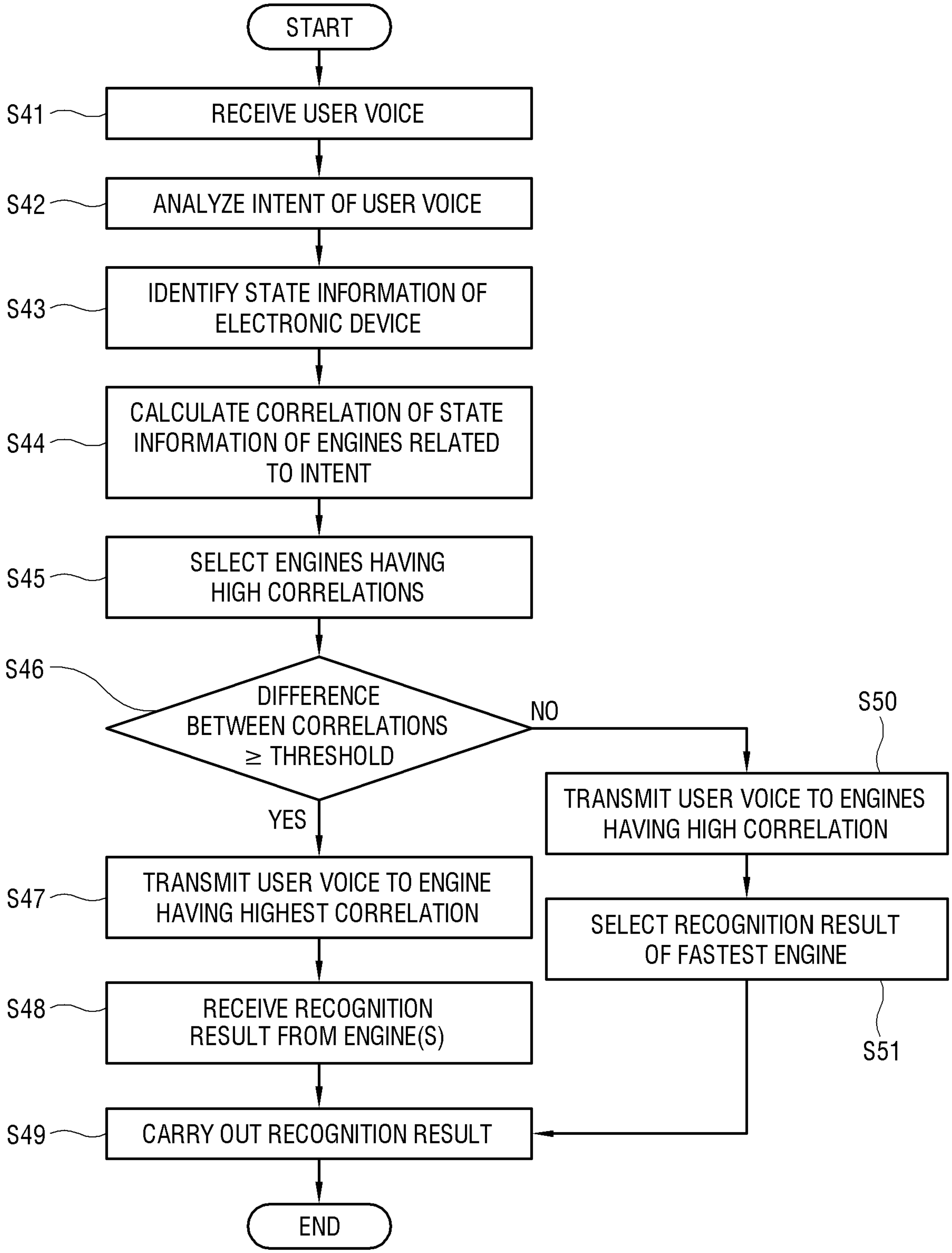
FIG. 23 is a flowchart of a method of controlling an electronic device according to a fourth embodiment of the disclosure.

FIG. 23 is a flowchart of a method of controlling an electronic device 1 according to a fourth embodiment of the disclosure. The following operations are performed by the processor 16 of the electronic device 1. The fourth embodiment shown in FIG. 23 selects an optimal engine based on difference in correlation between the plurality of engines, unlike the foregoing embodiments.

At operation S41, the electronic device 1 receives a user voice.

At operation S42, the electronic device 1 analyzes the intent of the received user voice. The intent of the user voice is analyzed through the default engine provided inside or outside the electronic device 1.

At operation S43, the electronic device 1 analyzes the state information of the items related to the electronic device 1. The item related to the electronic device 1 may, as shown in FIG. 5, include at least one of the power state, the network state, the account-login state, the voice speaker, the voice input route, the trigger presence, or the application state.

At operation S44, the electronic device 1 selects the engines corresponding to the intent based on the first reference data 400 of FIG. 4, and calculates the sums of the state information correlations based on the second reference data 500 of FIG. 5 with regard to the selected engines.

At operation S45, the electronic device 1 selects a plurality of engines of which the sums of state information correlations are high among the engines.

At operation S46, the electronic device 1 calculates a difference between the highest correlation sum and the other correlation sums with regard to the plurality of selected engines, and identifies whether the difference is greater than or equal to a threshold.

At operation S47, when the difference between the correlation sums is greater than or equal to the threshold, the user voice is transmitted to the engine having the highest correlation sum.

At operation S48, the electronic device 1 receives a recognition result of the selected engine.

At operation S49, the electronic device 1 carries out the recognition result of the selected engine.

At operation S50, when the difference between the correlation sums is smaller than the threshold in operation S46, the user voice is transmitted to all the engines which are within the range of the threshold.

At operation S51, the electronic device 1 receives recognition results from the plurality of selected engines, and selects the engine that provides the recognition result the fastest to thereby carry out the recognition result.

As described above, the electronic device 1 may select only one engine when the correlation sum of one selected engine is significantly different from those of the plurality of engines, but may select all the plurality of engines and operates one engine based on recognition results when there are the plurality of engines of which the correlation sums are similar.

Figure 24:
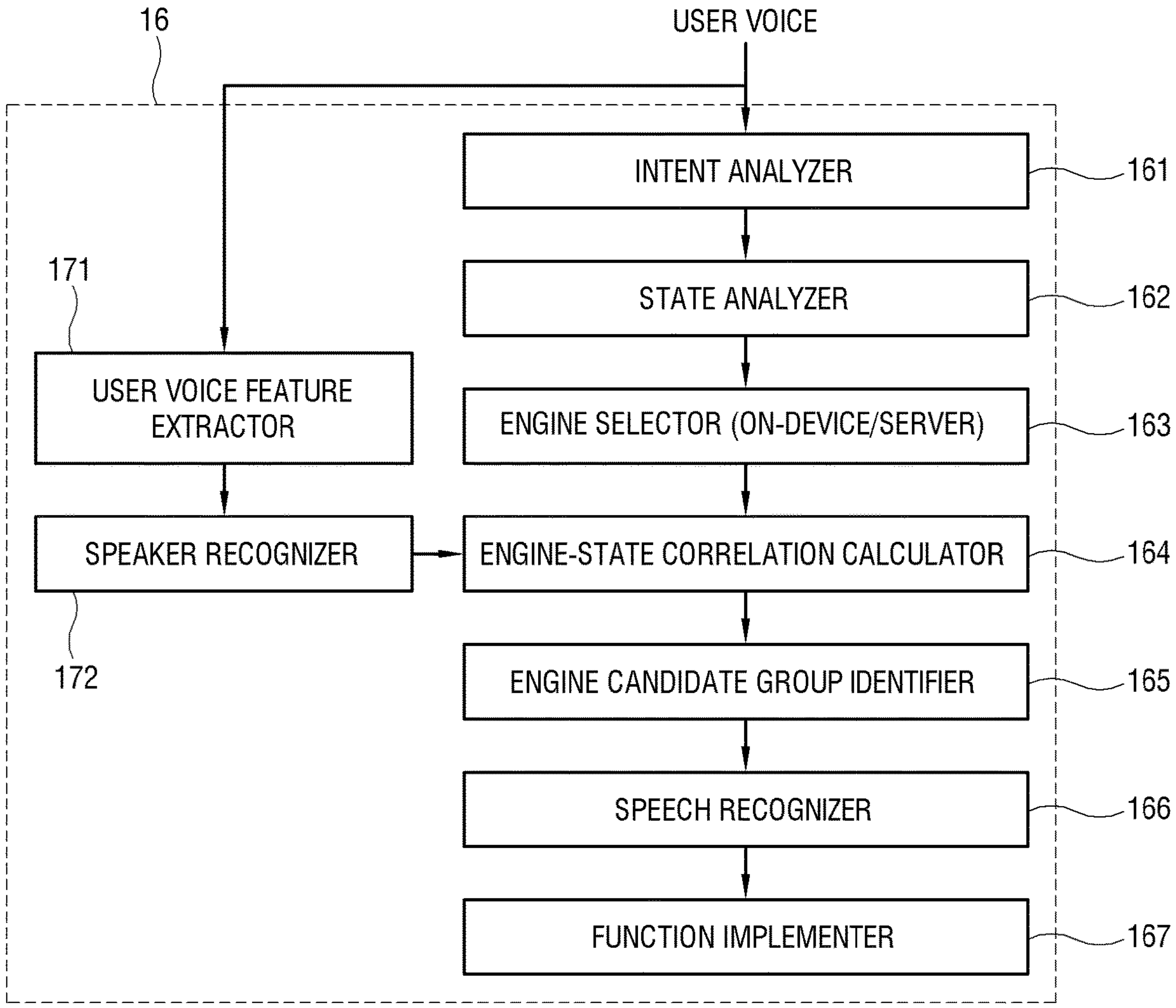
FIG. 24 is a block diagram of a processor in an electronic device according to a fifth embodiment of the disclosure.

FIG. 24 is a block diagram of a processor 16 in an electronic device 1 according to a fifth embodiment of the disclosure.

One among pieces of information about the states of the electronic device 1 include whether a "voice speaker" of a user voice is a child, a man, a woman or an elderly person. However, a somewhat complicated processing process may be used in analyzing who is the speaker of the user voice. Therefore, the electronic device 1 may additionally include a user voice feature extractor 171 and a speaker recognizer 172 to perform a separate processing process for speaker recognition.

The intent analyzer 161, the state analyzer 162, the engine selector 163, the engine-state correlation calculator 164, the engine candidate group identifier 165, the speech recognizer 166, and the function implementer 167 were described above with reference to FIG. 3, and thus repetitive descriptions thereof will be avoided as necessary.

The user voice feature extractor 171 may convert a user voice into a text, and extract voice features according to words of the text. The voice features may include a voice color, a voice tone, etc.

The speaker recognizer 172 identifies whether the speaker is a child, a man, a woman or an elderly person by comparing a reference voice feature of a voice feature DB and the voice feature of the user voice. The voice feature DB includes the reference voice feature data in which voice colors and voice tones of children, men, women and the elderly person are stored.

In this manner, the voice speaker of the user voice may be analyzed separately from a process of selecting the optimal engine.

Figure 25:
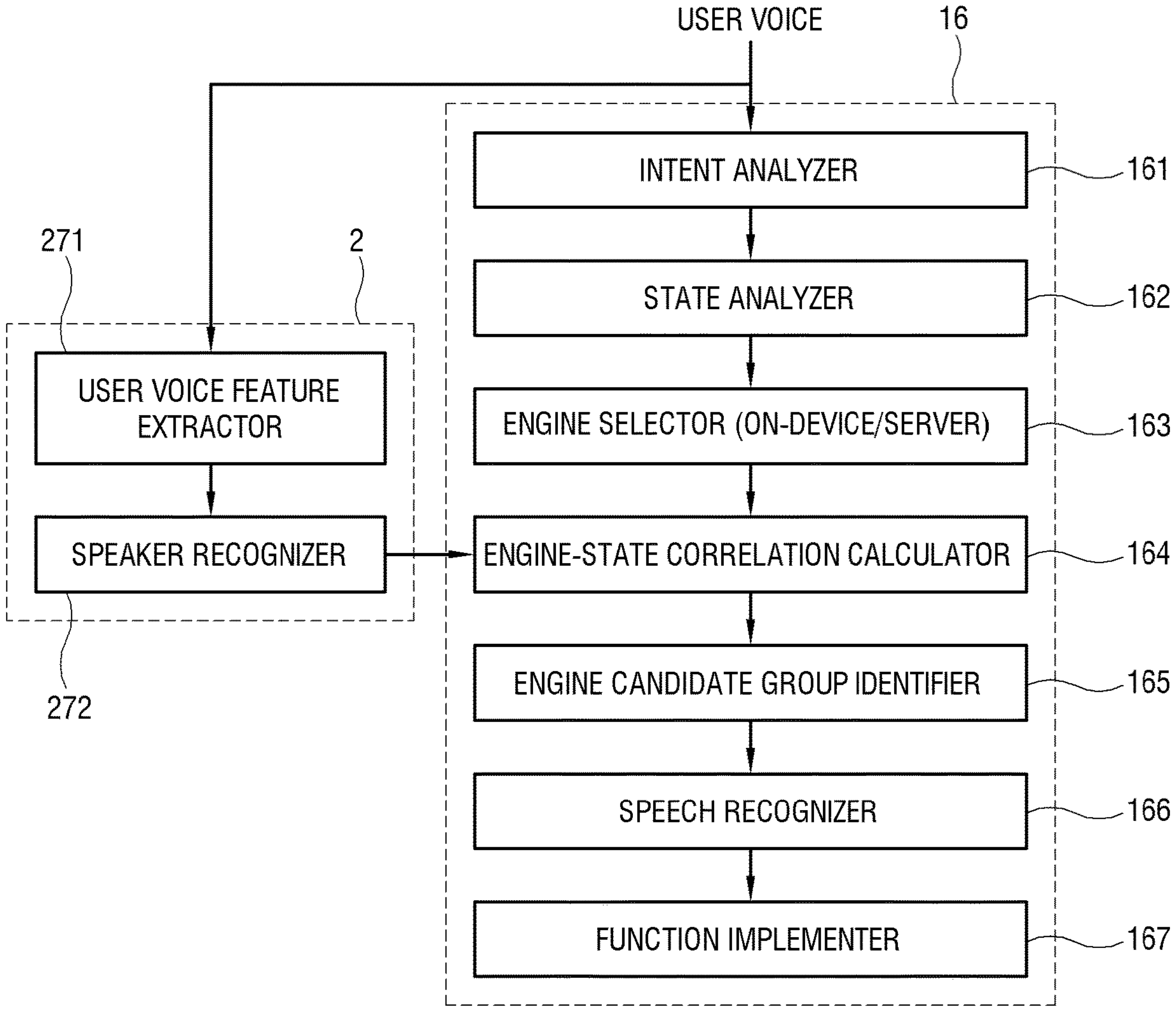
FIG. 25 is a block diagram of a processor in an electronic device according to a sixth embodiment of the disclosure.

FIG. 25 is a block diagram of a processor 16 in an electronic device 1 according to a sixth embodiment of the disclosure.

The electronic device 1 according to the sixth embodiment of the disclosure does not autonomously analyze who is a speaker of a user voice, but uses a user voice feature extractor 271 and a speaker recognizer 272 of the server 2 to recognize the speaker.

For example, the complicated and time-consuming operation of recognizing the speaker may be performed by the server 2, thereby reducing the load of the electronic device 1 and allowing the speaker recognition to be processed relatively quickly.

Figure 26:
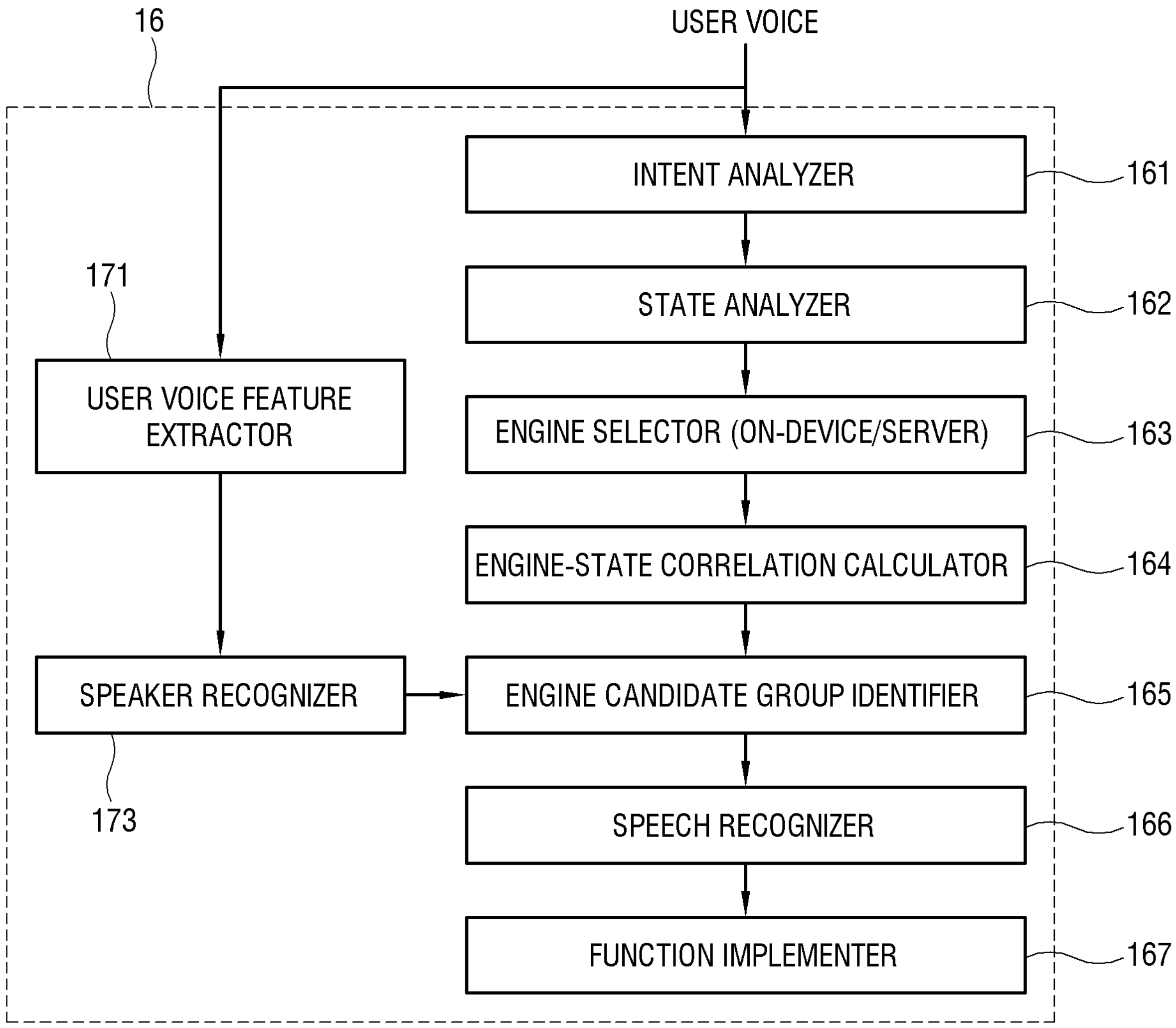
FIG. 26 is a block diagram of a processor in an electronic device according to a seventh embodiment of the disclosure.

FIG. 26 is a block diagram of a processor 16 in an electronic device 1 according to a seventh embodiment of the disclosure.

The electronic device 1 according to the fifth and sixth embodiments analyzes whether the "voice speaker" of the user voice is a child, a man, a woman or the elderly person based on the state information. However, under limited use environments, for example, under the condition that a user is specified, the correlations according to the engines are more differentiated by a specific analysis of who is the user than identifying the speaker as the child, the man, the woman or the elderly person.

The electronic device 1 according to the seventh embodiment of the disclosure may employ the user voice feature extractor 171 and a user recognizer 173 to specifically identify who is the user.

However, it may be more complicated and take more time to specify who is the speaker of the user voice. Therefore, the information about the state of the electronic device 1 may not be usable in selecting the optimal engine, but may be used as information for selecting on among the plurality of engines having the same or similar correlation sum or may be used later after being recorded in the stored history information.

Below, examples will be described in which the electronic device 1 obtains reference data for selecting an engine to recognize a user voice.

Figure 27:
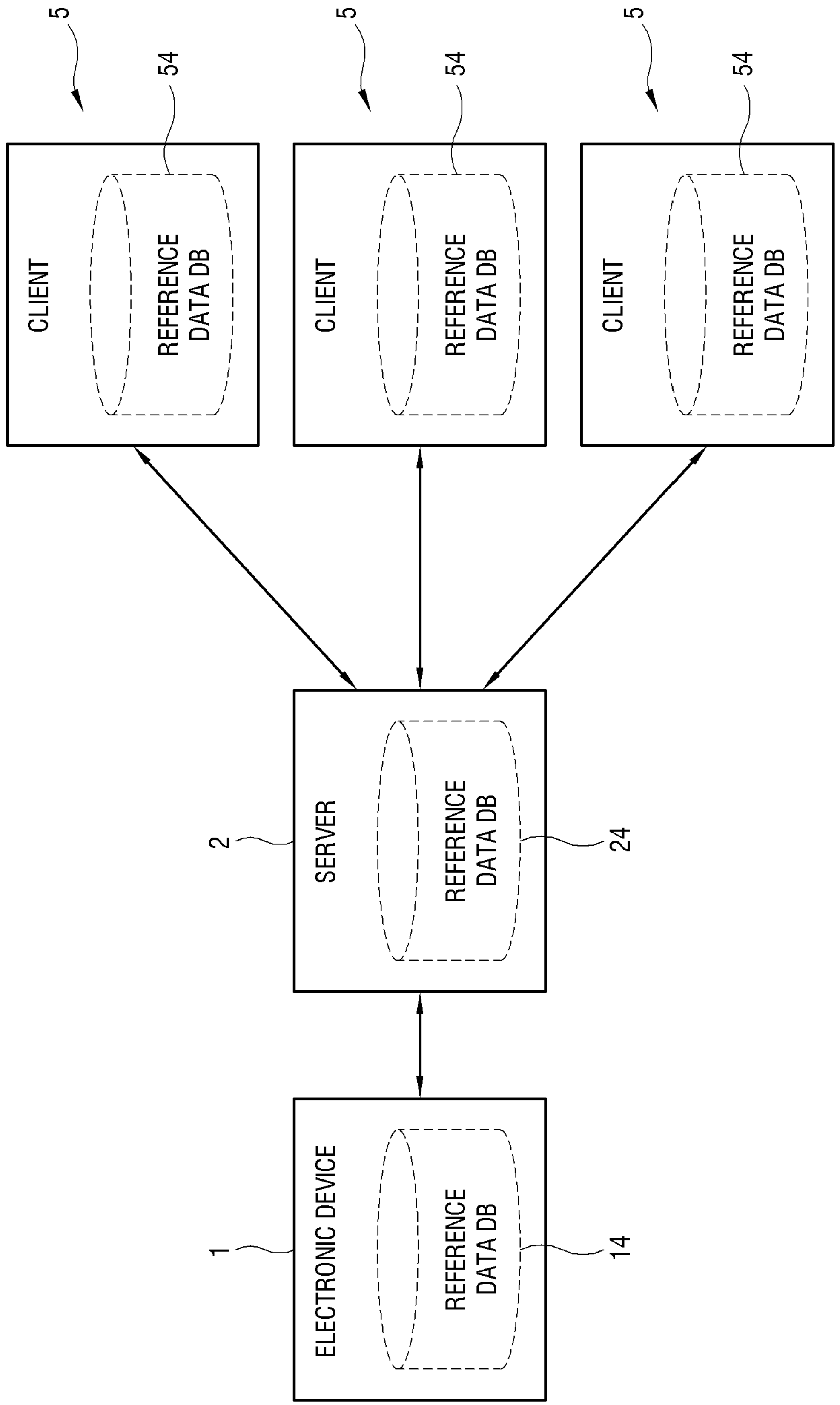
FIG. 27 is a block diagram of illustrating that the electronic device obtains reference data, according to an embodiment.

FIG. 27 is a block diagram of illustrating that the electronic device 1 obtains reference data.

As shown in FIG. 27, the electronic device 1 is connected to a network for communication with the server 2. The server 2 performs communication with a plurality of clients 5. The electronic device 1 is also one of the plurality of clients 5 and is merely different in terms for distinction from the client 5.

The electronic device 1 may generate the reference data by accumulating use histories from the beginning. However, in this case, it takes time to accumulate the use histories before a certain amount of data is secured which may guarantee the reliability of the reference data.

According to another method, the electronic device 1 may be released as a product in the state that the reference data having an initial value is stored in the storage 14 of the electronic device 1 at a manufacturing stage.

According to still another method, the electronic device 1 may receive the reference data from the server 2, and update the reference data by additionally reflecting the use history in the initial value of the received reference data. The server 2 may unidirectionally provide the stored reference data to only the electronic device 1. In embodiments, the server 2 may receive feedback on information about the update of the reference data from the electronic device 1 and update the previously stored reference data.

The server 2 collects information about the reference data stored in the clients 5 from the plurality of clients 5 connected for communication like the electronic device 1. The clients 5 may individually store the reference data, and update the individual reference data based on their own use histories.

The clients 5 provide the current information about the reference data to the server 2 periodically or in response to a request from the server 2.

The server 2 newly generates or updates the reference data based on information about the reference data obtained from the clients 5. A method of generating or updating the reference data may be variously designed.

The server 2 may provide such reference data to the electronic device 1 in response to the request of the electronic device 1 or when it is detected that the electronic device 1 is connected to the server 2. The server 2 may obtain and reflect the updated information of the reference data from the electronic device 1 like the foregoing clients 5.

The foregoing operations of the device may be performed by artificial intelligence provided in the corresponding device. The artificial intelligence may be applied to various general systems by utilizing a machine learning algorithm. An artificial intelligence system refers to a computer system with intelligence of a human or being second to a human. In such a system, a machine, a device or a system autonomously performs leaning and identifying and is improved in accuracy of recognition and identification based on accumulated experiences. The artificial intelligence is based utilizing machine learning technology and algorithms based on an algorithm of autonomously classifying and learning features of input data, and copying perception, identification and the like functions of a human brain.

The artificial intelligence may be based on technology which may for example include at least one of language comprehension technology for recognizing a language and a text of a human, visual understanding technology for recognizing a thing like a human sense of vision, inference and prediction technology for identifying information and logically making inference and prediction, knowledge representation technology for processing experience information of a human into knowledge data, and motion control technology for controlling a vehicle's automatic driving or a robot's motion.

Here, linguistic comprehension refers to technology of recognizing, applying and processing a human's language or text, and includes natural language processing, machine translation, conversation system, question and answer, voice recognition and synthesis, etc.

Inference and prediction refer to technology of identifying information and logically making prediction, and includes knowledge- and probability-based inference, optimized prediction, preference-based plan, recommendation, etc.

Knowledge representation refers to technology of automating a human's experience information into knowledge data, and includes knowledge building such as data creation and classification, knowledge management such as data utilization, etc.

The methods according to the foregoing embodiments may be achieved in the form of a program instruction that can be implemented in various computers, and recorded in a computer readable medium. Such a computer readable medium may include a program instruction, a data file, a data structure or the like, or combination thereof. For example, the computer readable medium may be stored in a nonvolatile storage such as universal serial bus (USB) memory, regardless of whether it is deletable or rewritable, for example, a RAM, a ROM, a flash memory, a memory chip, an integrated circuit (IC) or the like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the embodiments. The program instruction recorded in this storage medium may be specially designed and configured according to the embodiments, or may be publicly known and available to those skilled in the art of computer software. Further, the computer program instruction may be implemented by a computer program product.

What is claimed is:

1. An electronic device comprising:

a processor configured to:

receive a user voice input;

identify at least one state of the electronic device corresponding to at least one item related to the electronic device from among a plurality of states of the electronic device;

select a plurality of on-device voice recognition engines or a plurality of server voice recognition engines from among a plurality of voice recognition engines, based on the plurality of on-device voice recognition engines being selected, select a voice recognition engine corresponding to the identified at least one state, from among the plurality of on-device voice recognition engines, based on correlations between the plurality of voice recognition engines and the plurality of states;

based on the plurality of server voice recognition engines being selected, select the voice recognition engine corresponding to the identified at least one state, from among the plurality of server voice recognition engines, based on the correlations between the plurality of voice recognition engines and the plurality of states; and perform an operation corresponding to the user voice input based on the selected voice recognition engine, wherein the at least one item comprises at least one of: a network state, an account-login state, a voice speaker, a voice input route, trigger presence or an application running state.

2. The electronic device of claim 1, wherein the processor is further configured to:

identify an intent corresponding to the received user voice input from among a plurality of intents, and select the voice recognition engine based on correlations between the plurality of voice recognition engines and the plurality of intents.

3. The electronic device of claim 2, wherein the plurality of voice recognition engines comprises a default voice recognition engine, and wherein the default voice recognition engine is configured to analyze the intent of the user voice input.

4. The electronic device of claim 2, further comprising a storage configured to store first reference data in which at least one intent from among the plurality of intents is assigned to the plurality of voice recognition engines.

5. The electronic device of claim 4, wherein the storage is configured to store second reference data including at least one of the correlations between the correlations between the plurality of voice recognition engines and the plurality of states, and the correlations between the plurality of voice recognition engines and the plurality of intents.

6. The electronic device of claim 4, wherein the processor is further configured to calculate the correlations based on the at least one intent.

7. The electronic device of claim 5, wherein the processor is further configured to adjust at least one of the correlations between the correlations between the plurality of voice recognition engines and the plurality of states, and the correlations between the plurality of voice recognition engines and the plurality of intents based on a recognition result of the user voice input.

8. The electronic device of claim 5, wherein the processor is further configured to:

control the storage to store data about history information corresponding to recognition results of the user voice input; and select the voice recognition engine from among a plurality of voice recognition engines having a same correlation based on the history information.

9. The electronic device of claim 5, wherein the processor is further configured to:

control the storage to store data about history information corresponding to recognition results of the user voice input; and generate a rule for identifying the voice recognition engine based on the history information.

10. A method of controlling an electronic device, comprising:

receiving a user voice input;

identifying at least one state of the electronic device corresponding to at least one item related to the electronic device from among a plurality of states of the electronic device;

selecting a plurality of on-device voice recognition engines or a plurality of server voice recognition engines from among a plurality of voice recognition engines, based on the plurality of on-device voice recognition engines being selected, selecting a voice recognition engine corresponding to the identified state, from among the plurality of on-device voice recognition engines, based on correlations between the plurality of voice recognition engines and the plurality of states;

based on the plurality of server voice recognition engines being selected, selecting the voice recognition engine corresponding to the identified state, from among the plurality of server voice recognition engines, based on the correlations between the plurality of voice recognition engines and the plurality of states; and performing an operation corresponding to the user voice input based on the selected voice recognition engine, wherein the at least one item comprises at least one of: a network state, an account-login state, a voice speaker, a voice input route, trigger presence or an application running state.

11. The method of claim 10, further comprising:

identifying an intent corresponding to the received user voice input from among a plurality of intents; and selecting the voice recognition engine based on correlations between the plurality of voice recognition engines and the plurality of intents.

12. The method of claim 11, further comprising storing, in a storage, first reference data in which at least one intent from among the plurality of intents is assigned to the plurality of voice recognition engines.

13. The method of claim 11, wherein the plurality of voice recognition engines comprises a default voice recognition engine, and wherein the default voice recognition engine is configured to analyze the intent of the user voice input.

14. A method of controlling an electronic device, comprising:

receiving a user voice input;

determining, based on a default voice recognition engine from among a plurality of voice recognition engines, an intent corresponding to the user voice input, wherein the plurality of voice recognition engines comprises a plurality of on-device voice recognition engines which are stored on the electronic device, and a plurality of server voice recognition engines which are stored on a server;

identifying a state of the electronic device;

determining whether a selection rule exists identifying a preferred voice recognition engine corresponding to the intent and the state from among the plurality of voice recognition engines;

based on the selection rule existing, performing an operation corresponding to the user voice input based on the preferred voice recognition engine;

based on the selection rule not existing:

selecting the plurality of on-device voice recognition engines or the plurality of server voice recognition engines based on the intent, based on the plurality of on-device voice recognition engines being selected, selecting a voice recognition engine from among the plurality of on-device voice recognition engines based on the intent and a correlation between the state and the voice recognition engine, and based on the plurality of server voice recognition engines being selected, selecting the voice recognition engine from among the plurality of server voice recognition engines based on the intent and the correlation between the state and the voice recognition engine; and performing an operation corresponding to the user voice input based on the selected voice recognition engine.

15. The method of claim 14, wherein the selecting of the voice recognition engine further comprises:

based on the plurality of on-device voice recognition engines being selected, selecting the voice recognition engine from among the plurality of on-device voice recognition engines, based on the voice recognition engine having a highest correlation with the identified state from among correlations between the plurality of on-device voice recognition engines and a plurality of states, and based on the plurality of server voice recognition engines being selected, selecting the voice recognition engine from among the plurality of server voice recognition engines, based on the voice recognition engine having a highest correlation with the identified state from among correlations between the plurality of server voice recognition engines and the plurality of states.

16. The method of claim 15, wherein the default voice recognition engine is included in the plurality of on-device voice recognition engines.

17. The method of claim 15, wherein the plurality of on-device voice recognition engines relate to functions of the electronic device, and wherein the plurality of server voice recognition engines relate to provision of services from outside of the electronic device.

* * * * *